(12) United States Patent
Waldern et al.

(10) Patent No.: US 11,703,799 B2
(45) Date of Patent: *Jul. 18, 2023

(54) SYSTEMS AND METHODS FOR HIGH-THROUGHPUT RECORDING OF HOLOGRAPHIC GRATINGS IN WAVEGUIDE CELLS

(71) Applicant: DigiLens Inc., Sunnyvale, CA (US)

(72) Inventors: Jonathan David Waldern, Los Altos Hills, CA (US); Alastair John Grant, San Jose, CA (US); Milan Momcilo Popovich, Leicester (GB); Ratson Morad, Palo Alto, CA (US); Sean Michael Williams, Los Gatos, CA (US)

(73) Assignee: DigiLens Inc., Sunnyvale, CA (US)

( * ) Notice: Subject to any disclaimer, the term of this patent is extended or adjusted under 35 U.S.C. 154(b) by 182 days.

This patent is subject to a terminal disclaimer.

(21) Appl. No.: 16/935,048

(22) Filed: Jul. 21, 2020

(65) Prior Publication Data
US 2020/0363771 A1 Nov. 19, 2020

Related U.S. Application Data

(63) Continuation of application No. 16/116,834, filed on Aug. 29, 2018, now Pat. No. 10,732,569.
(Continued)

(51) Int. Cl.
*G03H 1/04* (2006.01)
*G02B 6/42* (2006.01)
(Continued)

(52) U.S. Cl.
CPC ......... *G03H 1/0408* (2013.01); *G02B 6/4204* (2013.01); *G03H 1/0248* (2013.01);
(Continued)

(58) Field of Classification Search
CPC .. G03H 1/0408; G03H 1/0248; G03H 1/0465; G03H 1/30; G03H 2001/0434;
(Continued)

(56) References Cited

U.S. PATENT DOCUMENTS

| 3,993,399 A | 11/1976 | Jacoby et al. |
| 4,133,152 A | 1/1979 | Penrose |

(Continued)

FOREIGN PATENT DOCUMENTS

| CN | 1357010 A | 7/2002 |
| CN | 1475547 A | 2/2004 |

(Continued)

OTHER PUBLICATIONS

Extended European Search Report for European Application No. 18897932.2, Search completed Dec. 22, 2021, dated Jan. 12, 2022, 8 Pgs.
(Continued)

*Primary Examiner* — Collin X Beatty
(74) *Attorney, Agent, or Firm* — KPPB LLP

(57) ABSTRACT

Holographic volume gratings in waveguide cells can be recorded using many different methods and systems in accordance with various embodiments of the invention. One embodiment includes a holographic recording system including at least one laser source configured to emit recording beams and a movable platform configured to move between a first position and a second position, wherein when the movable platform is in the first position, the at least one laser source is configured to emit a first set of one or more recording beams toward a first set of one or more stations and when the movable platform is in the second position, the at least one laser source is configured to emit a second set of one or more recording beams toward a second set of one or more stations.

20 Claims, 15 Drawing Sheets

Related U.S. Application Data

(60) Provisional application No. 62/703,329, filed on Jul. 25, 2018, provisional application No. 62/663,864, filed on Apr. 27, 2018, provisional application No. 62/614,813, filed on Jan. 8, 2018, provisional application No. 62/614,932, filed on Jan. 8, 2018, provisional application No. 62/614,831, filed on Jan. 8, 2018.

(51) Int. Cl.
  *G03H 1/02* (2006.01)
  *G03H 1/30* (2006.01)

(52) U.S. Cl.
  CPC ............ *G03H 1/0465* (2013.01); *G03H 1/30* (2013.01); *G03H 2001/0434* (2013.01); *G03H 2001/0439* (2013.01); *G03H 2222/34* (2013.01); *G03H 2223/16* (2013.01); *G03H 2223/24* (2013.01); *G03H 2223/50* (2013.01)

(58) Field of Classification Search
  CPC ....... G03H 2001/0439; G03H 2222/34; G03H 2223/16; G03H 2223/24; G03H 2223/50; G03H 1/202; G03H 1/0244; G03H 1/0276; G03H 1/265; G03H 2001/026; G03H 2001/207; G03H 2222/31; G03H 2223/20; G03H 2223/22; G03H 2223/25; G03H 2227/04; G03H 2260/33; G02B 6/4204; B29C 66/71; B29C 65/782; B29C 65/00; B29C 65/1406; B29C 65/4815; B29C 65/4835; B29C 65/4845; B29C 65/7811; B29C 65/7835; B29C 65/7847; B29C 66/1122; B29C 66/452; B29C 66/723; B29C 66/73341; B29C 66/8322
  See application file for complete search history.

(56) References Cited

U.S. PATENT DOCUMENTS

| | | |
|---|---|---|
| 5,198,914 A | 3/1993 | Arns |
| 5,225,918 A | 7/1993 | Taniguchi et al. |
| 5,499,118 A | 3/1996 | Wreede et al. |
| 6,266,166 B1 | 7/2001 | Katsumata et al. |
| 6,317,189 B1 | 11/2001 | Yuan et al. |
| 6,407,724 B2 | 6/2002 | Waldern et al. |
| 6,449,095 B1 | 9/2002 | Ohtaki et al. |
| 6,538,775 B1* | 3/2003 | Bowley .................. G03H 1/28 359/24 |
| 6,714,329 B2 | 3/2004 | Sekine et al. |
| 6,824,929 B2 | 11/2004 | Taggi et al. |
| 6,844,989 B1 | 1/2005 | Jo et al. |
| 6,919,003 B2 | 7/2005 | Ikeda et al. |
| 6,943,788 B2 | 9/2005 | Tomono |
| 7,376,068 B1 | 5/2008 | Khoury |
| 7,643,225 B1 | 1/2010 | Tsai |
| 7,691,248 B2 | 4/2010 | Ikeda et al. |
| 7,884,593 B2 | 2/2011 | Simmonds et al. |
| 8,917,962 B1 | 12/2014 | Nichol et al. |
| 8,933,144 B2 | 1/2015 | Enomoto et al. |
| 9,253,359 B2 | 2/2016 | Takahashi |
| 9,274,349 B2 | 3/2016 | Popovich et al. |
| 9,516,193 B2 | 12/2016 | Aramaki |
| 9,551,468 B2 | 1/2017 | Jones |
| 9,791,696 B2 | 10/2017 | Woltman et al. |
| 10,234,696 B2 | 3/2019 | Popovich et al. |
| 10,409,144 B2 | 9/2019 | Popovich et al. |
| 10,423,813 B2 | 9/2019 | Popovich et al. |
| 10,459,311 B2 | 10/2019 | Popovich et al. |
| 10,527,797 B2 | 1/2020 | Waldern et al. |
| 10,545,346 B2 | 1/2020 | Waldern et al. |
| 10,569,449 B1 | 2/2020 | Curts et al. |
| 10,578,876 B1 | 3/2020 | Lam et al. |
| 10,598,938 B1 | 3/2020 | Huang et al. |
| 10,613,268 B1 | 4/2020 | Colburn et al. |
| 10,642,058 B2 | 5/2020 | Popovich et al. |
| 10,649,119 B2 | 5/2020 | Mohanty et al. |
| 10,678,053 B2 | 6/2020 | Waldern et al. |
| 10,690,831 B2 | 6/2020 | Calafiore |
| 10,690,916 B2 | 6/2020 | Popovich et al. |
| 10,732,351 B2 | 8/2020 | Colburn et al. |
| 10,732,569 B2 | 8/2020 | Waldern et al. |
| 10,823,887 B1 | 11/2020 | Calafiore et al. |
| 10,983,257 B1 | 4/2021 | Colburn et al. |
| 11,103,892 B1 | 8/2021 | Liao et al. |
| 11,107,972 B2 | 8/2021 | Diest et al. |
| 11,137,603 B2 | 10/2021 | Zhang |
| 11,243,333 B1 | 2/2022 | Ouderkirk et al. |
| 11,306,193 B1 | 4/2022 | Lane et al. |
| 11,307,357 B2 | 4/2022 | Mohanty |
| 11,340,386 B1 | 5/2022 | Ouderkirk et al. |
| 11,391,950 B2 | 7/2022 | Calafiore |
| 11,402,801 B2 | 8/2022 | Waldern et al. |
| 2001/0033400 A1 | 10/2001 | Sutherland et al. |
| 2002/0018040 A1 | 2/2002 | Aye et al. |
| 2003/0058490 A1 | 3/2003 | Brotherton-ratcliffe et al. |
| 2003/0193709 A1 | 10/2003 | Mallya et al. |
| 2003/0206329 A1 | 11/2003 | Ikeda et al. |
| 2004/0184156 A1 | 9/2004 | Gunn, III et al. |
| 2005/0174321 A1 | 8/2005 | Ikeda et al. |
| 2007/0109400 A1 | 5/2007 | Woodgate et al. |
| 2007/0127348 A1 | 6/2007 | Ooi et al. |
| 2007/0146624 A1 | 6/2007 | Duston et al. |
| 2007/0195409 A1 | 8/2007 | Yun et al. |
| 2008/0225187 A1 | 9/2008 | Yamanaka |
| 2010/0225834 A1 | 9/2010 | Li |
| 2010/0253987 A1 | 10/2010 | Leopold et al. |
| 2011/0221656 A1 | 9/2011 | Haddick et al. |
| 2012/0326950 A1 | 12/2012 | Park et al. |
| 2013/0088637 A1 | 4/2013 | Duparre |
| 2013/0107186 A1 | 5/2013 | Ando et al. |
| 2013/0308185 A1 | 11/2013 | Robinson et al. |
| 2014/0043672 A1 | 2/2014 | Clarke et al. |
| 2014/0126029 A1 | 5/2014 | Fuetterer |
| 2014/0138581 A1 | 5/2014 | Archetti et al. |
| 2014/0255662 A1 | 9/2014 | Enomoto et al. |
| 2016/0060529 A1 | 3/2016 | Hegmann et al. |
| 2016/0097959 A1 | 4/2016 | Bruizeman et al. |
| 2016/0178901 A1 | 6/2016 | Ishikawa |
| 2017/0032166 A1 | 2/2017 | Raguin et al. |
| 2017/0131545 A1 | 5/2017 | Wall et al. |
| 2018/0252869 A1 | 9/2018 | Ayres et al. |
| 2019/0042827 A1 | 2/2019 | Popovich et al. |
| 2019/0094548 A1 | 3/2019 | Nicholson et al. |
| 2019/0187538 A1 | 6/2019 | Popovich et al. |
| 2019/0212195 A9 | 7/2019 | Popovich et al. |
| 2019/0212698 A1 | 7/2019 | Waldern et al. |
| 2019/0219822 A1 | 7/2019 | Popovich et al. |
| 2019/0265486 A1 | 8/2019 | Hansotte et al. |
| 2019/0278224 A1 | 9/2019 | Schlottau et al. |
| 2020/0026074 A1 | 1/2020 | Waldern et al. |
| 2020/0033190 A1 | 1/2020 | Popovich et al. |
| 2020/0033801 A1 | 1/2020 | Waldern et al. |
| 2020/0033802 A1 | 1/2020 | Popovich et al. |
| 2020/0057353 A1 | 2/2020 | Popovich et al. |
| 2020/0081317 A1 | 3/2020 | Popovich et al. |
| 2020/0142131 A1 | 5/2020 | Waldern et al. |
| 2020/0159026 A1 | 5/2020 | Waldern et al. |
| 2020/0201051 A1 | 6/2020 | Popovich et al. |
| 2020/0247016 A1 | 8/2020 | Calafiore |
| 2020/0249568 A1 | 8/2020 | Rao et al. |
| 2020/0271973 A1 | 8/2020 | Waldern et al. |
| 2021/0026297 A1 | 1/2021 | Waldern et al. |
| 2021/0109285 A1 | 4/2021 | Jiang et al. |
| 2021/0191122 A1 | 6/2021 | Yaroshchuk et al. |
| 2021/0199873 A1 | 7/2021 | Shi et al. |
| 2021/0199971 A1 | 7/2021 | Lee et al. |
| 2021/0216040 A1 | 7/2021 | Waldern et al. |
| 2021/0223585 A1 | 7/2021 | Waldern et al. |
| 2021/0238374 A1 | 8/2021 | Ye et al. |
| 2021/0364836 A1 | 11/2021 | Waldern et al. |
| 2022/0019015 A1 | 1/2022 | Calafiore et al. |

(56) References Cited

U.S. PATENT DOCUMENTS

| | | |
|---|---|---|
| 2022/0057749 A1 | 2/2022 | Popovich et al. |
| 2022/0082739 A1 | 3/2022 | Franke et al. |
| 2022/0091323 A1 | 3/2022 | Yaroshchuk et al. |
| 2022/0204790 A1 | 6/2022 | Zhang et al. |
| 2022/0206232 A1 | 6/2022 | Zhang et al. |

FOREIGN PATENT DOCUMENTS

| | | | |
|---|---|---|---|
| CN | 1678948 | A | 10/2005 |
| CN | 101793555 | A | 8/2010 |
| CN | 101793987 | A | 8/2010 |
| CN | 101945612 | A | 1/2011 |
| CN | 102393548 | A | 3/2012 |
| CN | 102498425 | A | 6/2012 |
| CN | 103562802 | A | 2/2014 |
| CN | 104076424 | A | 10/2014 |
| CN | 104246626 | A | 12/2014 |
| CN | 105940451 | A | 9/2016 |
| CN | 110383117 | A | 10/2019 |
| CN | 111566571 | A | 8/2020 |
| CN | 111615655 | A | 9/2020 |
| CN | 111684362 | A | 9/2020 |
| CN | 111902768 | A | 11/2020 |
| CN | 113728075 | A | 11/2021 |
| CN | 111684362 | B | 3/2022 |
| CN | 114341686 | A | 4/2022 |
| CN | 111566571 | B | 5/2022 |
| CN | 114721242 | A | 7/2022 |
| CN | 115356905 | A | 11/2022 |
| EP | 1828832 | B1 | 5/2013 |
| EP | 1573369 | B1 | 7/2014 |
| EP | 1402298 | B1 | 9/2016 |
| EP | 3548939 | A2 | 10/2019 |
| EP | 3710876 | A1 | 9/2020 |
| EP | 3710887 | A1 | 9/2020 |
| EP | 3710893 | A1 | 9/2020 |
| EP | 3710894 | A1 | 9/2020 |
| EP | 3927793 | A1 | 12/2021 |
| EP | 4004615 | A1 | 6/2022 |
| FI | 20176157 | A1 | 6/2019 |
| FI | 20176161 | A1 | 6/2019 |
| JP | S49092850 | U | 8/1974 |
| JP | 57089722 | A | 6/1982 |
| JP | H04303812 | A | 10/1992 |
| JP | H04303813 | A | 10/1992 |
| JP | H09185313 | A | 7/1997 |
| JP | 10096903 | A | 4/1998 |
| JP | 2000515996 | A | 11/2000 |
| JP | 2001181316 | A | 7/2001 |
| JP | 2002/0311379 | A | 10/2002 |
| JP | 2005222963 | A | 8/2005 |
| JP | 2005331757 | A | 12/2005 |
| JP | 2007094175 | A | 4/2007 |
| JP | 2007199699 | A | 8/2007 |
| JP | 2010217928 | A | 9/2010 |
| JP | 2011075681 | A | 4/2011 |
| JP | 2011232510 | A | 11/2011 |
| JP | 2012014804 | A | 1/2012 |
| JP | 2016030503 | A | 3/2016 |
| JP | 2017194547 | A | 10/2017 |
| JP | 2018521350 | A | 8/2018 |
| JP | 6598269 | B2 | 10/2019 |
| JP | 6680793 | B2 | 3/2020 |
| JP | 2020514783 | A | 5/2020 |
| JP | 2021509488 | A | 3/2021 |
| JP | 2021509736 | A | 4/2021 |
| JP | 2021509737 | A | 4/2021 |
| JP | 2021509739 | A | 4/2021 |
| JP | 2021530747 | A | 11/2021 |
| JP | 2022-523365 | A | 4/2022 |
| JP | 2022542248 | A | 9/2022 |
| KR | 20150072151 | A | 6/2015 |
| KR | 20200104402 | A | 9/2020 |
| KR | 20200106170 | A | 9/2020 |
| KR | 1020200106932 | A | 9/2020 |
| KR | 1020200108030 | A | 9/2020 |
| KR | 1020210127237 | A | 10/2021 |
| KR | 1020220036963 | A | 3/2022 |
| WO | 9216880 | A1 | 10/1992 |
| WO | 9701133 | A1 | 1/1997 |
| WO | 2002/0082168 | A1 | 10/2002 |
| WO | 2005047988 | A1 | 5/2005 |
| WO | 2008011066 | A3 | 12/2008 |
| WO | 2009013597 | A2 | 1/2009 |
| WO | 2012052352 | A1 | 4/2012 |
| WO | 2013027006 | A1 | 2/2013 |
| WO | 2016044193 | A1 | 3/2016 |
| WO | 2016181108 | A1 | 11/2016 |
| WO | 2016046514 | A8 | 4/2017 |
| WO | 2017120320 | A1 | 7/2017 |
| WO | 2017134412 | A1 | 8/2017 |
| WO | 2017180923 | A1 | 10/2017 |
| WO | 2017182771 | A1 | 10/2017 |
| WO | 2017203200 | A1 | 11/2017 |
| WO | 2017203201 | A1 | 11/2017 |
| WO | 2017207987 | A1 | 12/2017 |
| WO | 2018096359 | A3 | 7/2018 |
| WO | 2018150163 | A1 | 8/2018 |
| WO | 2018206487 | A1 | 11/2018 |
| WO | 2019077307 | A1 | 4/2019 |
| WO | 2019079350 | A3 | 4/2019 |
| WO | 2019122806 | A1 | 6/2019 |
| WO | 2019136470 | A1 | 7/2019 |
| WO | 2019171038 | A1 | 9/2019 |
| WO | 2019185973 | A1 | 10/2019 |
| WO | 2019185975 | A1 | 10/2019 |
| WO | 2019185976 | A1 | 10/2019 |
| WO | 2019185977 | A1 | 10/2019 |
| WO | 2020023779 | A1 | 1/2020 |
| WO | 2020172681 | A1 | 8/2020 |
| WO | 2020212682 | A1 | 10/2020 |
| WO | 2021016371 | A1 | 1/2021 |
| WO | 2021032982 | A1 | 2/2021 |
| WO | 2021032983 | A1 | 2/2021 |
| WO | 2021044121 | A1 | 3/2021 |

OTHER PUBLICATIONS

Extended European Search Report for European Application No. 18898154.2, Search completed Aug. 13, 2021, dated Aug. 23, 2021, 7 pgs.

Extended European Search Report for European Application No. 19736108.2, Search completed Sep. 15, 2021, dated Sep. 27, 2021, 8 pgs.

Extended Search Report for European Application No. 18898841.4, Search completed Mar. 18, 2021, dated Mar. 26, 2021, 10 pgs.

International Preliminary Report on Patentability for International Application PCT/US2020/043107, Report dated Jan. 25, 2022, dated Feb. 3, 2022, 6 Pgs.

International Preliminary Report on Patentability for International Application No. PCT/GB2016/000051, Report dated Sep. 19, 2017, dated Sep. 28, 2017, 7 Pgs.

International Preliminary Report on Patentability for International Application No. PCT/US2018/012227, Report dated Jul. 30, 2019, dated Aug. 8, 2019, 7 Pgs.

International Preliminary Report on Patentability for International Application No. PCT/US2018/037410, Report dated Jul. 14, 2020, dated Jul. 23, 2020, 7 Pgs.

International Preliminary Report on Patentability for International Application No. PCT/US2018/048636, Report dated Jul. 14, 2020, dated Jul. 23, 2020, 9 Pgs.

International Preliminary Report on Patentability for International Application No. PCT/US2018/062835, Report dated Jul. 14, 2020, dated Jul. 23, 2020, 7 Pgs.

International Preliminary Report on Patentability for International Application No. PCT/US2019/012758, Report dated Jul. 14, 2020, dated Jul. 23, 2020, 4 Pgs.

International Preliminary Report on Patentability for International Application No. PCT/US2019/012759, Report dated Jul. 14, 2020, dated Jul. 23, 2020, 6 Pgs.

(56) References Cited

OTHER PUBLICATIONS

International Preliminary Report on Patentability for International Application PCT/US2018/048960, Report dated Mar. 3, 2020, dated Mar. 12, 2020, 7 pgs.
International Preliminary Report on Patentability for International Application PCT/US2019/012764, Report dated Jul. 14, 2020, dated Jul. 23, 2020, 5 pgs.
International Preliminary Report on Patentability for International Application PCT/US2019/031163, Report dated Nov. 10, 2020, dated Nov. 19, 2020, 6 pgs.
International Preliminary Report on Patentability for International Application PCT/US2019/043496 Report dated Jan. 26, 2021, dated Feb. 4, 2021, 5 pgs.
International Preliminary Report on Patentability for International Application PCT/US2020/019549, Report dated Aug. 10, 2021, dated Sep. 2, 2021, 7 pgs.
International Search Report and Written Opinion for International Application No. PCT/US2018/012227, Search completed Feb. 28, 2018, dated Mar. 14, 2018, 8 Pgs.
International Search Report and Written Opinion for International Application No. PCT/US2019/064765, Search completed Feb. 3, 2020, dated Mar. 18, 2020, 11 Pgs.
International Search Report and Written Opinion for International Application No. PCT/US2019/065478, Search completed Jan. 29, 2020, dated Feb. 11, 2020, 14 pgs.
International Search Report and Written Opinion for International Application No. PCT/US2020/018686, Search completed Apr. 25, 2020, dated May 22, 2020, 11 Pgs.
International Search Report and Written Opinion for International Application No. PCT/US2020/031363, completed May 28, 2020, dated Jun. 10, 2020, 8 pgs.
International Search Report and Written Opinion for International Application No. PCT/US2020/043107, Search completed Sep. 28, 2020, dated Oct. 15, 2020, 12 pgs.
International Search Report for PCT/GB2016/000051, Completed Aug. 11, 2016, 3 Pgs.
Supplementary Partial European Search Report for European Application No. 18727645.6, Search completed Jul. 2, 2020, dated Jul. 13, 2020, 13 pgs.
Fuh et al., "Thermally and Electrically Switchable Gratings Based Upon the Polymer-Balls Type Polymer-Dispersed Liquid Crystal Films", Appl. Phys. vol. 41, No. 22, Aug. 1, 2002, pp. 4585-4589.
Gerritsen et al., "Application of Kogelnik's two-wave theory to deep, slanted, highly efficient, relief transmission gratings", Applied Optics, Mar. 1, 1991, vol. 30; No. 7, pp. 807-814.
Golub et al., "Bragg properties of efficient surface relief gratings in the resonance domain", Optics Communications, Feb. 24, 2004, vol. 235, pp. 261-267, doi: 10.1016/j.optcom.2004.02.069.
Jeong et al., "Memory Effect of Polymer Dispersed Liquid Crystal by Hybridization with Nanoclay", express Polymer Letters, vol. 4, No. 1, 2010, pp. 39-46, DOI: 10.3144/expresspolymlett.2010.7.
Liu et al., "Realization and Optimization of Holographic Waveguide Display System", Acta Optica Sinica, vol. 37, Issue 5, dated May 10, 2017, pp. 310-317.
Moharam et al., "Diffraction characteristics of photoresist surface-relief gratings", Applied Optics, Sep. 15, 1984, vol. 23, pp. 3214-3220.
Sabel et al., "Simultaneous formation of holographic surface relief gratings and volume phase gratings in photosensitive polymer", Materials Research Letters, May 30, 2019, vol. 7, No. 10, pp. 405-411, doi: 10.1080/21663831.2019.1621956.
Sakhno et al., "Deep surface relief grating in azobenzene-containing materials using a low-intensity 532 nm laser", Optical Materials: X, Jan. 23, 2019, 100006, pp. 3-7, doi: 10.1016/j.omx.2019.100006.
Tondiglia et al., "Holographic Formation of Electro-Optical Polymer-Liquid Crystal Photonic Crystals", Advanced Materials, 2002, Published Online Nov. 8, 2001, vol. 14, No. 3, pp. 187-191.
Yang et al., "Robust and Accurate Surface Measurement Using Structured Light", IEEE, Apr. 30, 2008, vol. 57, Issue 6, pp. 1275-1280, DOI:10.1109/TIM.2007.915103.
Yokomori, "Dielectric surface-relief gratings with high diffraction efficiency", Applied Optics, Jul. 15, 1984, vol. 23; No. 14, pp. 2303-2310.
Extended European Search Report for European Application No. 20760111.3, Search completed Sep. 19, 2022, dated Sep. 29, 2022, 12 Pgs.

* cited by examiner

SYSTEMS AND METHODS FOR HIGH-THROUGHPUT RECORDING OF HOLOGRAPHIC GRATINGS IN WAVEGUIDE CELLS

CROSS-REFERENCE TO RELATED APPLICATIONS

The current application is a Continuation of U.S. patent application Ser. No. 16/116,834 entitled "Systems and Methods for High-Throughput Recording of Holographic Gratings in Waveguide Cells," filed Aug. 29, 2018, which claims the benefit of and priority under 35 U.S.C. § 119(e) to U.S. Provisional Patent Application No. 62/614,932 entitled "Methods for Fabricating Optical Waveguides," filed Jan. 8, 2018; U.S. Provisional Patent Application No. 62/614,813 entitled "Low Haze Liquid Crystal Materials," filed Jan. 8, 2018; and U.S. Provisional Patent Application No. 62/614,831 entitled "Liquid Crystal Materials and Formulations," filed Jan. 8, 2018; U.S. Provisional Patent Application No. 62/663,864 entitled "Method and Apparatus for Fabricating Holographic Gratings," filed Apr. 27, 2018; and U.S. Provisional Patent Application No. 62/703,329 entitled "Systems and Methods for Fabricating a Multilayer Optical Structure," filed Jul. 25, 2018, the disclosures of which are incorporated hereby reference in their entireties.

FIELD OF THE INVENTION

The present invention generally relates to processes and apparatuses for recording gratings and, more specifically, for recording holographic volume gratings in waveguide cells.

BACKGROUND

Waveguides can be referred to as structures with the capability of confining and guiding waves (i.e., restricting the spatial region in which waves can propagate). One subclass includes optical waveguides, which are structures that can guide electromagnetic waves, typically those in the visible spectrum. Waveguide structures can be designed to control the propagation path of waves using a number of different mechanisms. For example, planar waveguides can be designed to utilize diffraction gratings to diffract and couple incident light into the waveguide structure such that the in-coupled light can proceed to travel within the planar structure via total internal reflection ("TIR").

Fabrication of waveguides can include the use of material systems that allow for the recording of holographic optical elements within the waveguides. One class of such material includes polymer dispersed liquid crystal ("PDLC") mixtures, which are mixtures containing photopolymerizable monomers and liquid crystals. A further subclass of such mixtures includes holographic polymer dispersed liquid crystal ("HPDLC") mixtures. Holographic optical elements, such as volume phase gratings, can be recorded in such a liquid mixture by illuminating the material with two mutually coherent laser beams. During the recording process, the monomers polymerize and the mixture undergoes a photo-polymerization-induced phase separation, creating regions densely populated by liquid crystal micro-droplets, interspersed with regions of clear polymer. The alternating liquid crystal-rich and liquid crystal-depleted regions form the fringe planes of the grating.

Waveguide optics, such as those described above, can be considered for a range of display and sensor applications. In many applications, waveguides containing one or more grating layers encoding multiple optical functions can be realized using various waveguide architectures and material systems, enabling new innovations in near-eye displays for Augmented Reality ("AR") and Virtual Reality ("VR"), compact Heads Up Displays ("HUDs") for aviation and road transport, and sensors for biometric and laser radar ("LIDAR") applications.

SUMMARY OF THE INVENTION

One embodiment includes a holographic recording system including at least one laser source configured to emit recording beams, a first set of one or more stations configured to house a first set of waveguide cells, a second set of one or more stations configured to house a second set of waveguide cells, and a movable platform configured to move between a first position and a second position, wherein when the movable platform is in the first position, the at least one laser source is configured to emit a first set of one or more recording beams toward the first set of one or more stations and when the movable platform is in the second position, the at least one laser source is configured to emit a second set of one or more recording beams toward the second set of one or more stations.

In another embodiment, the holographic recording system further includes a plurality of mirrors, wherein when the movable platform is in the first position, the at least one laser source is configured to emit the first set of one or more recording beams toward the first set of one or more stations by using the plurality of mirrors to direct the first set of one or more recording beams.

In a further embodiment, wherein the first set of one or more recording beams includes a first recording beam and a second recording beam.

In still another embodiment, the at least one laser source includes a first laser source and a second laser source, and when the movable platform is in the first position, the first laser source is configured to emit the first recording beam toward the first set of one or more stations and the second laser source is configured to emit the second recording beam toward the first set of one or more stations.

In a still further embodiment, the holographic recording system further includes a beamsplitter, wherein the at least one laser source is configured to emit the first and second recording beams by emitting an initial beam toward the beamsplitter.

In yet another embodiment, the first set of one or more stations includes a first station, and when the movable platform is in the first position, the at least one laser source is configured to emit the first and second recording beams toward the first station.

In a yet further embodiment, the first set of one or more stations includes a first station and a second station, and when the movable platform is in the first position, the at least one laser source is configured to emit the first recording beam toward the first station and the second recording beam toward the second station.

In another additional embodiment, the holographic recording system further includes a beamsplitter mounted on the movable platform, wherein when the movable platform is in the first position, the at least one laser source is configured to emit the first and second recording beams by emitting an initial beam toward the beamsplitter.

In a further additional embodiment, the holographic recording system further includes a pair of beamsplitters mounted on the movable platform and a stationary beamsplitter, wherein the first set of one or more stations includes a first station and a second station, the first set of one or more recording beams includes first, second, third, and fourth recording beams, and when the movable platform is in the first position, the at least one laser source is configured to emit the first and second recording beams toward the first station and to emit the third and fourth recording beams toward the second station, wherein the first, second, third, and fourth recording beams are formed using the pair of beamsplitters and the stationary beamsplitter.

In another embodiment again, the holographic recording system further includes a beamsplitter, wherein the at least one laser source is configured to emit the first and second recording beams by emitting an initial beam toward the beamsplitter.

In a further embodiment again, the first set of one or more stations includes a first station, and when the movable platform is in the first position, the at least one laser source is configured to emit the first and second recording beams toward the first station.

In still yet another embodiment, the first set of one or more stations includes a first station and a second station, and when the movable platform is in the first position, the at least one laser source is configured to emit the first recording beam toward the first station and the second recording beam toward the second station.

In a still yet further embodiment, the holographic recording system further includes a beamsplitter mounted on the movable platform, wherein when the movable platform is in the first position, the at least one laser source is configured to emit the first and second recording beams by emitting an initial beam toward the beamsplitter.

In still another additional embodiment, the holographic recording system further includes a pair of beamsplitters mounted on the movable platform and a stationary beamsplitter, wherein the first set of one or more stations includes a first station and a second station, the first set of one or more recording beams comprises first, second, third, and fourth recording beams, and when the movable platform is in the first position, the at least one laser source is configured to emit the first and second recording beams toward the first station and to emit the third and fourth recording beams toward the second station, wherein the first, second, third, and fourth recording beams are formed using the pair of beamsplitters and the stationary beamsplitter.

In a still further additional embodiment, each of the stations within the first and second sets of stations includes an optical filter for filtering out ambient light.

A still another embodiment again includes a method including emitting a first set of one or more recording beams using at least one laser source, directing the emitted first set of one or more recording beams toward a first set of one or more waveguide cells housed in a first set of one or more stations using at least one optical component mounted on a movable platform, recording a first set of one or more volume gratings in the first set of one or more waveguide cells, repositioning the movable platform, emitting a second set of one or more recording beams using the at least one laser source, directing the emitted second set of one or more recording beams toward a second set of one or more waveguide cells housed in a second set of one or more stations using the at least one optical component mounted on the movable platform, and recording a second set of one or more volume gratings in the second set of one or more waveguide cells.

In a still further embodiment again, the first set of one or more recording beams includes a first recording beam and a second recording beam.

In yet another additional embodiment, the at least one laser source includes a first laser source and a second laser source, and the first recording beam is emitted by the first laser source and the second recording beam is emitted by the second laser source.

In a yet further additional embodiment, the first and second recording beams are formed by emitting an initial beam toward a beamsplitter.

In yet another embodiment again, the first set of one or more waveguide cells includes a first waveguide cell and the emitted first and second recording beams are directed toward the first waveguide cell.

In a yet further embodiment again, the first set of one or more waveguide cells includes a first waveguide cell and a second waveguide cell, and the emitted first recording beam is directed toward the first waveguide cell and the emitted second recording beam is directed toward the second waveguide cell.

In another additional embodiment again, the first and second recording beams are formed by emitting an initial beam toward a beamsplitter mounted on the movable platform.

In a further additional embodiment again, the at least one optical component includes a first mounted beamsplitter and a second mounted beamsplitter, the first set of one or more waveguide cells includes a first waveguide cell and a second waveguide cell, the first set of one or more recording beams is emitted using at least one laser source by emitting an initial recording beam toward a stationary beamsplitter to form a first recording beam and a second recording beam, directing the first recording beam toward the first mounted beamsplitter to form a first recording sub-beam and a second recording sub-beam, and directing the second recording beam toward the second mounted beamsplitter to form a third recording sub-beam and a fourth recording sub-beam, and the emitted first set of one or more recording beams is directed toward a first set of one or more waveguide cells by directing the first and third recording sub-beams toward the first waveguide cell, and directing the second and fourth recording sub-beams toward the second waveguide cell.

In still yet another additional embodiment, the first set of one or more volume gratings is recorded using a single beam interference process.

A still yet further additional embodiment includes a holographic recording system including a laser source, first, second, third, and fourth stations, wherein each station includes an exposure stack and a waveguide cell stage, wherein the waveguide cell stage is configured to house a waveguide cell, position the waveguide cell such that a surface of the waveguide cell is parallel to a surface of the exposure stack, and maintain the position of the waveguide cell while accounting for micro-movements, a pair of stationary beamsplitters, a movable platform mounted on a track, wherein the movable platform is configured to move along the track between a first position and a second position, three beamsplitters mounted on the movable platform, wherein when the movable platform is in the first position, the laser source is configured to emit a first set of six recording sub-beams simultaneously by emitting a first initial recording beam toward the pair of stationary beamsplitters to form a first set of three recording beams, and directing the first set of three recording beams toward the three mounted beamsplitters to form the first set of six recording sub-beams, direct three recording sub-beams within the first set of the six recording sub-beams toward the first station, and direct the other three recording sub-beams within the first set of six recording sub-beams toward the second station, and when the movable platform is in the second position, the laser source is configured to emit a second set of six recording sub-beams simultaneously by emitting a second initial recording beam toward the pair of stationary beamsplitters to form a second set of three recording beams, and directing the second set of three recording beams toward the three mounted beamsplitters to form the second set of six recording sub-beams, direct three recording sub-beams within the second set of the six recording sub-beams toward the third station, and direct the other three recording sub-beams within the second set of six recording sub-beams toward the fourth station.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention. It will apparent to those skilled in the art that the present invention may be practiced with some or all of the present invention as disclosed in the following description.

DETAILED DESCRIPTION

Figure 1A:
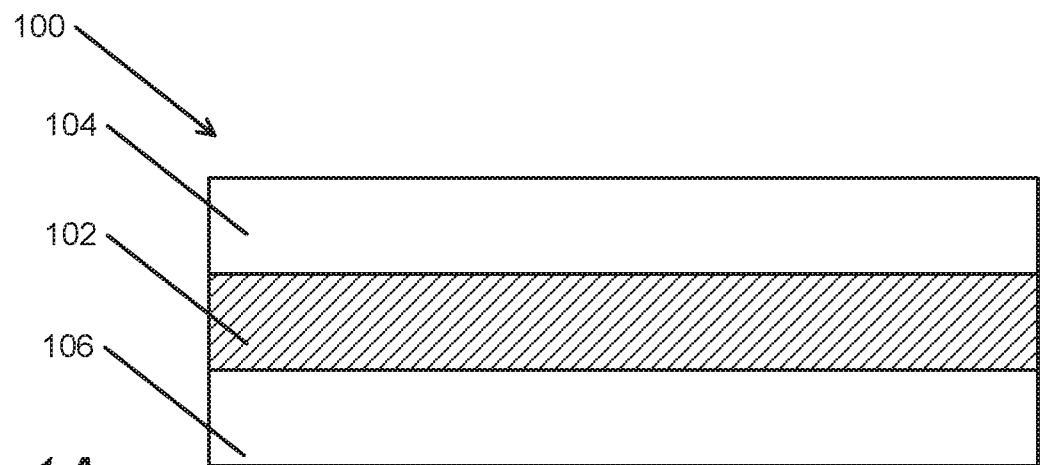
FIG. 1A conceptually illustrates a profile view of a waveguide cell in accordance with an embodiment of the invention.

For the purposes of describing embodiments, some well-known features of optical technology known to those skilled in the art of optical design and visual displays have been omitted or simplified in order not to obscure the basic principles of the invention. Unless otherwise stated, the term "on-axis" in relation to a ray or a beam direction refers to propagation parallel to an axis normal to the surfaces of the optical components described in relation to the invention. In the following description, the terms light, ray, beam, and direction may be used interchangeably and in association with each other to indicate the direction of propagation of light energy along rectilinear trajectories. Parts of the following description will be presented using terminology commonly employed by those skilled in the art of optical design. For illustrative purposes, it is to be understood that, for clarity purposes, the drawings are not drawn to scale unless stated otherwise. Furthermore, each element of each drawing may not be in proper proportion to each of the other elements in the drawing for clarity purposes.

Turning now to the drawings, systems and methods for recording holographic gratings in waveguide cells are illustrated. A system for recording optical elements, such as but not limited to volume gratings, in an optical recording medium can be implemented in many different ways in accordance with various embodiments of the invention. In many embodiments, the recording system is configured to record a volume grating in an optical recording medium of a waveguide cell. In further embodiments, the volume grating is recorded by exposing the recording medium to an interference pattern formed using at least one laser source. In some embodiments, the recording system is configured to simultaneously record a plurality of volume gratings. The plurality of volume gratings can be recorded in one waveguide cell or across multiple waveguide cells. In several embodiments, the plurality of volume gratings is recorded in a stack(s) of waveguide cells.

Different types of exposure sources can be utilized depending on the specific application and can be configured accordingly. Additionally, the number of exposure sources utilized can also vary. In some embodiments, multiple exposure sources are used to simultaneously record a plurality of volume gratings. In a number of embodiments, the recording system is configured to utilize a single laser source in conjunction with beam splitters and mirrors to simultaneously record a plurality of volume gratings. The recording system can be further configured to record sets of volume gratings using a movable platform. In such embodiments, the exposure source(s) is configured to direct recording beams toward a first set of waveguide cells to record a first set of volume gratings. The system can then be configured to reposition component(s) within the system using the movable platform, which can allow for recording beams from the exposure source(s) to be directed toward a second set of waveguide cells in order to record a second set of volume gratings. In several embodiments, the exposure delivered to any given waveguide cell can be configured to have one or more exposure energy, exposure duration, and/or exposure on/off schedule varying spatially across the recording plane. These configurations and additional systems and methods for recording optical elements in waveguide cells are discussed below in further detail.

Waveguide Cells

A waveguide cell can be defined as a device containing uncured and/or unexposed optical recording material in which optical elements, such as but not limited to gratings, can be recorded. In many embodiments, optical elements can be recorded in the waveguide cell by exposing the optical recording material to certain wavelengths of electromagnetic radiation. Typically, a waveguide cell is constructed such that the optical recording material is sandwiched between two substrates, creating a three-layer waveguide cell. Depending on the application, waveguide cells can be constructed in a variety of configurations. In some embodiments, the waveguide cell contains more than three layers. In a number of embodiments, the waveguide cell contains different types of layers that can serve various purposes. For example, waveguide cells can include protective cover layers, polarization control layers, and alignment layers.

Substrates of varying materials and shapes can be used in the construction of waveguide cells. In many embodiments, the substrates are plates made of a transparent material, such as but not limited to glass and plastics. Substrates of different shapes, such as but not limited to rectangular and curvilinear shapes, can be used depending on the application. The thicknesses of the substrates can also vary depending on the application. Oftentimes, the shapes of the substrates can determine the overall shape of the waveguide. In a number of embodiments, the waveguide cell contains two substrates that are of the same shape. In other embodiments, the substrates are of different shapes. As can readily be appreciated, the shapes, dimensions, and materials of the substrates can vary and can depend on the specific requirements of a given application.

In many embodiments, beads, or other particles, are dispersed throughout the optical recording material to help control the thickness of the layer of optical recording material and to help prevent the two substrates from collapsing onto one another. In some embodiments, the waveguide cell is constructed with an optical recording layer sandwiched between two planar substrates. Depending on the type of optical recording material used, thickness control can be difficult to achieve due to the viscosity of some optical recording materials and the lack of a bounding perimeter for the optical recording layer. In a number of embodiments, the beads are relatively incompressible solids, which can allow for the construction of waveguide cells with consistent thicknesses. The size of a bead can determine a localized minimum thickness for the area around the individual bead. As such, the dimensions of the beads can be selected to help attain the desired optical recording layer thickness. The beads can be made of any of a variety of materials, including but not limited to glass and plastics. In several embodiments, the material of the beads is selected such that its refractive index does not substantially affect the propagation of light within the waveguide cell.

In some embodiments, the waveguide cell is constructed such that the two substrates are parallel or substantially parallel. In such embodiments, relatively similar sized beads can be dispersed throughout the optical recording material to help attain a uniform thickness throughout the layer. In other embodiments, the waveguide cell has a tapered profile. A tapered waveguide cell can be constructed by dispersing beads of different sizes across the optical recording material. As discussed above, the size of a bead can determine the local minimum thickness of the optical recording material layer. By dispersing the beads in a pattern of increasing size across the material layer, a tapered layer of optical recording material can be formed when the material is sandwiched between two substrates.

Waveguide cells in accordance with various embodiments of the invention can incorporate a variety of light-sensitive materials. In many embodiments, the waveguide cell incorporates a holographic polymer dispersed liquid crystal mixture as the optical recording medium. HPDLC mixtures in accordance with various embodiments of the invention generally include liquid crystals ("LCs"), monomers, photoinitiator dyes, and coinitiators. The mixture (often referred to as syrup) frequently also includes a surfactant. For the purposes of describing the invention, a surfactant is defined as any chemical agent that lowers the surface tension of the total liquid mixture. The use of surfactants in HPDLC mixtures is known and dates back to the earliest investigations of HPDLCs. For example, a paper by R. L Sutherland et al., SPIE Vol. 2689, 158-169, 1996, the disclosure of which is incorporated herein by reference, describes a HPDLC mixture including a monomer, photoinitiator, coinitiator, chain extender, and LCs to which a surfactant can be added. Surfactants are also mentioned in a paper by Natarajan et al, Journal of Nonlinear Optical Physics and Materials, Vol. 5 No. 1 89-98, 1996, the disclosure of which is incorporated herein by reference. Furthermore, U.S. Pat. No. 7,018,563 by Sutherland; et al., discusses holographic polymer-dispersed liquid crystal material for forming a polymer-dispersed liquid crystal optical element having at least one acrylic acid monomer, at least one type of liquid crystal material, a photoinitiator dye, a coinitiator, and a surfactant. The disclosure of U.S. Pat. No. 7,018,563 is hereby incorporated by reference in its entirety.

The patent and scientific literature contains many examples of material systems and processes that can be used to fabricate waveguides incorporating volume gratings, including investigations into formulating such material systems for achieving high diffraction efficiency, fast response time, low drive voltage, and so forth. U.S. Pat. No. 5,942,157 by Sutherland, and U.S. Pat. No. 5,751,452 by Tanaka et al. both describe monomer and liquid crystal material combinations suitable for fabricating waveguides incorporating volume gratings. Examples of recipes can also be found in papers dating back to the early 1990s. Many of these materials use acrylate monomers, including:

R. L. Sutherland et al., Chem. Mater. 5, 1533 (1993), the disclosure of which is incorporated herein by reference, describes the use of acrylate polymers and surfactants. Specifically, the recipe includes a crosslinking multi-functional acrylate monomer; a chain extender N-vinyl pyrrolidinone, LC E7, photo-initiator rose Bengal, and coinitiator N-phenyl glycine. Surfactant octanoic acid was added in certain variants.

Fontecchio et al., SID 00 Digest 774-776, 2000, the disclosure of which is incorporated herein by reference, describes a UV curable HPDLC for reflective display applications including a multi-functional acrylate monomer, LC, a photoinitiator, a coinitiators, and a chain terminator.

Y. H. Cho, et al., Polymer International, 48, 1085-1090, 1999, the disclosure of which is incorporated herein by reference, discloses HPDLC recipes including acrylates.

Karasawa et al., Japanese Journal of Applied Physics, Vol. 36, 6388-6392, 1997, the disclosure of which is incorporated herein by reference, describes acrylates of various functional orders.

T. J. Bunning et al., Polymer Science: Part B: Polymer Physics, Vol. 35, 2825-2833, 1997, the disclosure of which is incorporated herein by reference, also describes multifunctional acrylate monomers.

G. S. Iannacchione et al., Europhysics Letters Vol. 36 (6). 425-430, 1996, the disclosure of which is incorporated herein by reference, describes a PDLC mixture including a penta-acrylate monomer, LC, chain extender, coinitiators, and photoinitiator.

Acrylates offer the benefits of fast kinetics, good mixing with other materials, and compatibility with film forming processes. Since acrylates are cross-linked, they tend to be mechanically robust and flexible. For example, urethane acrylates of functionality 2 (di) and 3 (tri) have been used extensively for HPDLC technology. Higher functionality materials such as penta and hex functional stems have also been used. Although HPDLC mixtures with specific components are discussed above in relation with their suitable uses as the optical recording material in a waveguide cell, specific formulations of optical recording materials can vary widely and can depend on the specific requirements of a given application. Such considerations can include diffraction efficiency ("DE"), haze, solar immunity, transparency, and switching requirements.

Waveguide cells can be constructed using a variety of different methods. In many embodiments, a waveguide cell is constructed by coating a first substrate with an optical recording material capable of acting as an optical recording medium. In a number of embodiments, the optical recording material is deposited onto the substrate using spin coating or spraying. A second substrate layer can be incorporated to form the waveguide cell such that the optical recording material is sandwiched between two substrates. In several embodiments, the second substrate can be a thin protective film coated onto the exposed layer. In various embodiments, the substrates are used to make a cell, which is then filled with the optical recording material. The filling process can be accomplished using a variety of different methods, such as but not limited vacuum filling methods. In further embodiments, alignment layers and/or polarization layers can be added.

Figure 1B:
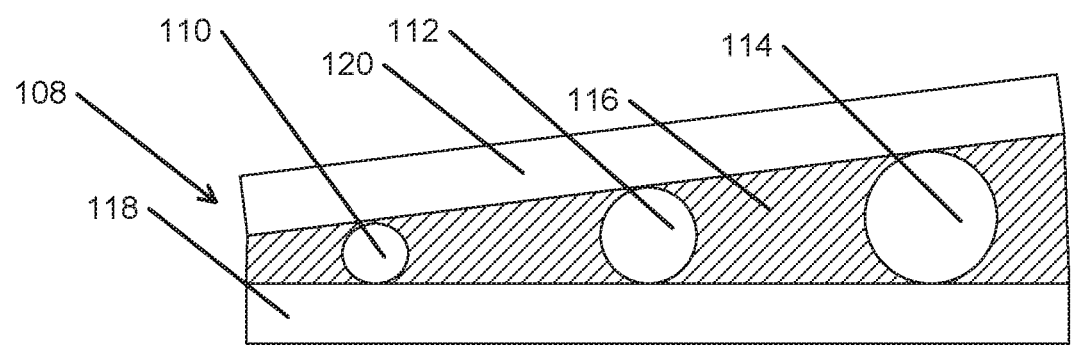
FIG. 1B conceptually illustrates a waveguide cell with a tapered profile in accordance with an embodiment of the invention.
Figure 1C:
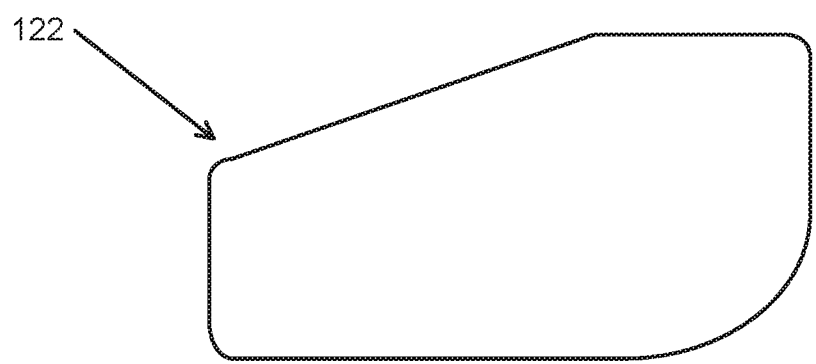
FIG. 1C conceptually illustrates a top view of a waveguide cell in accordance with an embodiment of the invention.
Figures 2A, 2B:
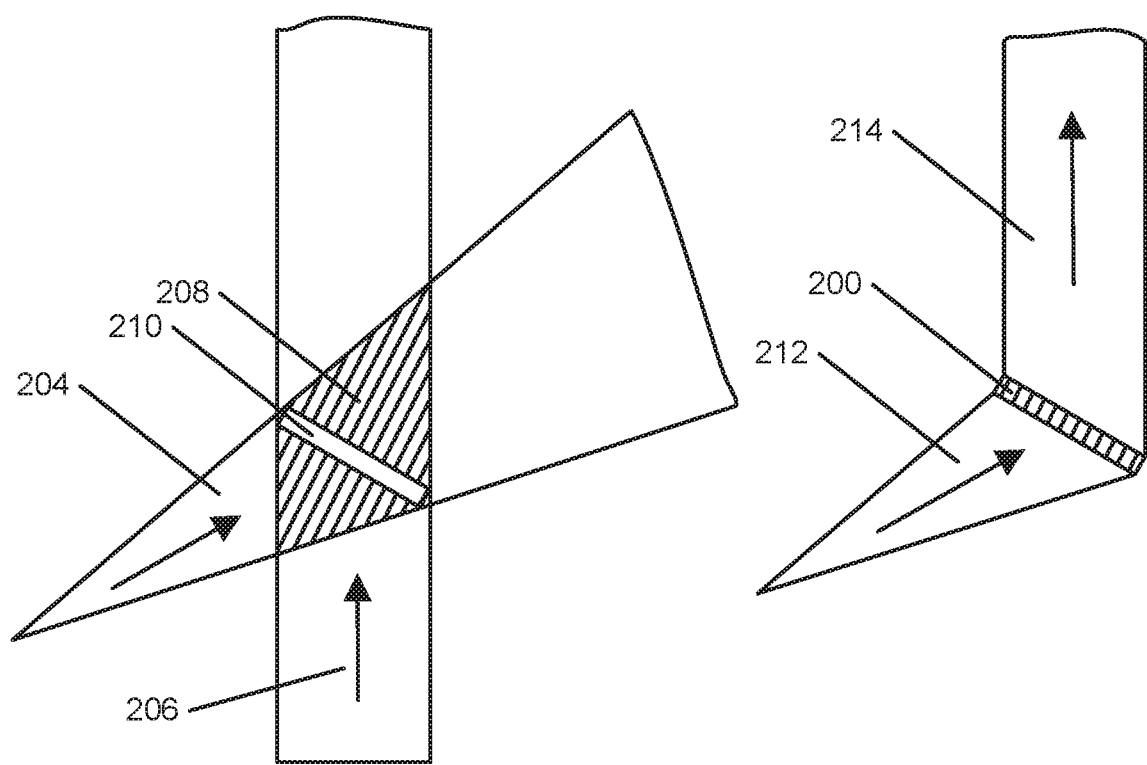
FIGS. 2A-2D conceptually illustrate two-beam recording processes in accordance with various embodiments of the invention.
Figures 2C, 2D:
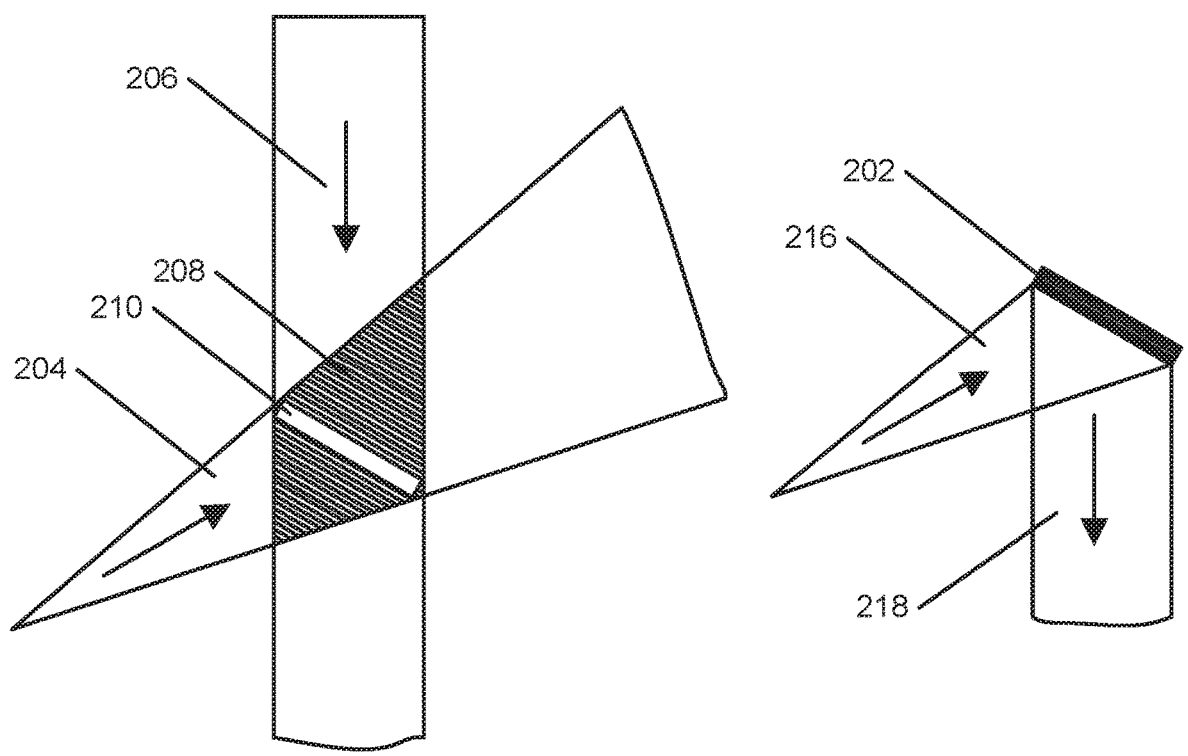

A profile view of a waveguide cell 100 in accordance with an embodiment of the invention is conceptually illustrated in FIG. 1A. As shown, the waveguide cell 100 includes a layer of optical recording material 102 that can be used as a recording medium for optical elements, such as but not limited to gratings. The optical recording material 102 can be any of a variety of compounds, mixtures, or solutions, such as but not limited to the HPDLC mixtures described in the sections above. In the illustrative embodiment, the optical recording material 102 is sandwich between two parallel glass plates 104, 106. In other embodiments, the substrates are arranged in a non-parallel configuration. FIG. 1B conceptually illustrates a profile view of a tapered waveguide cell 108 utilizing beads 110, 112, and 114 in accordance with an embodiment of the invention. As shown, beads 110, 112, and 114 vary in size and are dispersed throughout an optical recording material 116 sandwiched by two glass plates 118, 120. During construction of the waveguide cell, the local thickness of an area of the optical recording layer is limited by the sizes of the beads in that particular area. By dispersing the beads in an increasing order of sizes across the optical recording material, a tapered waveguide cell can be constructed when the substrates are placed in contact with the beads. As discussed above, substrates utilized in waveguide cells can vary in thicknesses and shapes. In many embodiments, the substrate is rectangular in shape. In some embodiments, the shape of the waveguide cell is a combination of curvilinear components. FIG. 1C conceptually illustrates a top view of a waveguide cell 122 having a curvilinear shape in accordance with an embodiment of the invention.

Although FIGS. 1A-1C illustrate specific waveguide cell constructions and arrangements, waveguide cells can be constructed in many different configurations and can use a variety of different materials depending on the specific requirements of a given application. For example, substrates can be made of transparent plastic polymers instead of glass. Additionally, the shapes and sizes of the waveguide cells can vary greatly and can be determined by various factors, such as but not limited to the application of the waveguide, ergonomic considerations, and economical factors.

Volume Bragg Gratings

Many different types of gratings capable of exhibiting different optical properties can be recorded in an optical recording material in accordance with various embodiments of the invention. In many waveguide applications, diffraction gratings are implemented for various purposes and functions. As can readily be appreciated, the type of grating selected can depend on the specific requirements of a given application. One type of grating that can be recorded in waveguide cells is a volume Bragg grating. A volume Bragg grating is a transparent medium that can diffract certain wavelengths of light incident at certain angles due to a periodic variation in the refractive index of the medium. The diffraction of light incident on the grating can be determined by the characteristic of the light and the grating. Volume Bragg gratings can have high efficiency with little light being diffracted into higher orders. The relative amount of light in the diffracted and zero order can be varied by controlling the refractive index modulation of the grating. Utilizing volume Bragg gratings within a waveguide, the propagation of light within the waveguide can be affected in a controlled manner to achieve various effects.

Volume Bragg gratings can be constructed to have desired characteristics depending on the specific application. In a number of embodiments, the volume Bragg grating is designed to be a transmission grating. In other embodiments, the volume Bragg grating is designed to be a reflection grating. In transmission gratings, incident light meeting the Bragg condition is diffracted such that the diffracted light exits the grating on the side that the incident light did not enter. For reflection gratings, the diffracted light exits on the same side of the grating as where the incident light entered. Volume gratings can also be designed with fringes that are tilted and/or slanted relative to the grating surface, which can affect the angles of diffraction/reflection. Although the discussions above denote the grating structures as either transmission or reflection, both types of gratings behave in the same manner according to the standard grating equation.

One class of Bragg grating elements includes Switchable Bragg Gratings ("SBGs"). An SBG is a diffractive device that can be formed by recording a volume phase grating in an HPDLC mixture. SBGs can be fabricated by first placing a thin film of a mixture of photopolymerizable monomers and liquid crystal material between glass plates or substrates. In many cases, the glass plates are in a parallel configuration. Techniques for making and filling glass cells are well known in the liquid crystal display industry. One or both glass plates can support electrodes, typically transparent tin oxide films, for applying an electric field across the film. SBGs can be implemented as waveguide devices in which the HPDLC mixture forms either the waveguide core or an evanescently coupled layer in proximity to the waveguide. The glass plates used to form the HPDLC cell can provide a total internal reflection light guiding structure. Light is coupled out of the SBG when the switchable grating diffracts the light at an angle beyond the TIR condition. The grating structure in an SBG can be recorded in the film of HPDLC material through photopolymerization-induced phase separation using interferential exposure with a spatially periodic intensity modulation. Factors such as but not limited to control of the irradiation intensity, component volume fractions of the HPDLC material, and exposure temperature can determine the resulting grating morphology and performance. During the recording process, the monomers polymerize and the mixture undergoes a phase separation. The LC molecules aggregate to form discrete or coalesced droplets that are periodically distributed in polymer networks on the scale of optical wavelengths. The alternating liquid crystal-rich and liquid crystal-depleted regions form the fringe planes of the grating, which can produce Bragg diffraction with a strong optical polarization resulting from the orientation ordering of the LC molecules in the droplets.

The volume phase grating can exhibit very high diffraction efficiency, which can be controlled by the magnitude of the electric field applied across the film. When an electric field is applied to the grating via transparent electrodes, the natural orientation of the LC droplets can change, causing the refractive index modulation of the fringes to lower and the hologram diffraction efficiency to drop to very low levels. Typically, the electrodes are configured such that the applied electric field will be perpendicular to the substrates. In a number of embodiments, the electrodes are fabricated from Indium Tin Oxide ("ITO"). In the OFF state with no electric field applied, the extraordinary axis of the liquid crystals generally aligns normal to the fringes. The grating thus exhibits high refractive index modulation and high diffraction efficiency for P-polarized light. When an electric field is applied to the HPDLC, the grating switches to the ON state wherein the extraordinary axes of the liquid crystal molecules align parallel to the applied field and hence perpendicular to the substrate. In the ON state, the grating exhibits lower refractive index modulation and lower diffraction efficiency for both S- and P-polarized light. Thus, the grating region no longer diffracts light. Each grating region can be divided into a multiplicity of grating elements such as for example a pixel matrix according to the function of the HPDLC device. Typically, the electrode on one substrate surface is uniform and continuous, while electrodes on the opposing substrate surface are patterned in accordance to the multiplicity of selectively switchable grating elements.

Typically, the SBG elements are switched clear in 30 μs with a longer relaxation time to switch ON. Note that the diffraction efficiency of the device can be adjusted, by means of the applied voltage, over a continuous range. In many cases, the device exhibits near 100% efficiency with no voltage applied and essentially zero efficiency with a sufficiently high voltage applied. SBGs can also be fabricated and implemented with reverse mode operation. In such cases, the grating is in its non-diffracting (cleared) state when the applied voltage is zero and switches to its diffracting stated when a voltage is applied across the electrodes. In certain types of HPDLC devices, magnetic fields can be used to control the LC orientation. In some HPDLC applications, phase separation of the LC material from the polymer can be accomplished to such a degree that no discernible droplet structure results. An SBG can also be used as a passive grating. In this mode, its chief benefit is a uniquely high refractive index modulation. SBGs can also be used to provide transmission or reflection gratings for free space applications.

Volume Bragg gratings can be implemented in waveguides for a variety of different purposes, such as but not limited to redirecting light and preventing the transmission of light. Volume Bragg gratings can also be used to provide beam expansion. For example, in many waveguide applications, volume Bragg gratings are used to provide beam expansion in two orthogonal directions. In display applications, this translates to a large eyebox. Thus, volume Bragg gratings can be used to preserve eyebox size while reducing lens size by effectively expanding the exit pupil of a collimating optical system. The exit pupil can be defined as a virtual aperture where only the light rays that pass though this virtual aperture can enter a user's eyes.

In many embodiments, volume Bragg gratings are implemented as input gratings for coupling light into the waveguide by diffracting the light at an angle within the TIR condition of the waveguide. Similarly, volume Bragg gratings can also be implemented as output gratings for coupling light out of the waveguide by diffracting the light at an angle beyond the TIR condition. A volume Bragg grating can also be implemented as a fold grating. In some embodiments, the Bragg fringes of the fold grating are oriented in a diagonal direction relative to the Bragg fringes of the other gratings. Depending on the orientation of the fold grating, light can be directed toward a specific direction upon interaction with the fold grating. In many embodiments, a longitudinal edge of a fold grating is oblique to the axis of alignment of the input coupler such that the fold grating is set on a diagonal with respect to the direction of propagation of the display light. The fold grating can be angled such that light from the input coupler is redirected to the output grating. In some embodiments, the fold grating is set at a forty-five-degree angle relative to the direction that the light is released from the input grating. This feature can cause the display image propagating down the fold grating to be turned into the output grating. For example, in several embodiments, the fold grating causes the image to be turned ninety degrees into the output grating. In various embodiments, each of the fold gratings can have a partially diffractive structure. In a number of embodiments, each of the fold gratings can have a fully diffractive structure.

Different grating configurations and technologies can be incorporated in a single waveguide. The fold grating can be configured to provide pupil expansion in one direction and to direct the light to the output grating via TIR inside the waveguide. The output grating can be configured to provide pupil expansion in a second direction different than the first direction and to cause the light to exit the waveguide from the waveguide. In this manner, a single waveguide can provide pupil expansion in both the horizontal and vertical directions. As can readily be appreciated, volume Bragg gratings can be implemented in many different configurations, such as but not limited to gratings having spatially varying K-vectors and multiplexed gratings. In many applications, waveguides are implemented using a two-grating structure capable of dual axis pupil expansion.

Due to the limited range of wavelengths and angles over which diffraction occurs in volume Bragg gratings, several methods can be utilized to increase the diffraction bandwidth of the gratings. In many embodiments, the recording system is configured to record volume gratings with fringes having spatially varying K-vector. The K-vector (which is also referred to in the literature as the grating vector) can be defined as a vector orthogonal to the plane of the associated grating fringe, which can determine the optical efficiency for a given range of input and diffracted angles. Each K-vector is associated with a fringe slant angle (as defined in the Kogelnik theory). In a number of embodiments, the plane within which the K-vectors vary is out of plane with the waveguide or grating element. Varying fringe slant angles, or rolled K-vectors, can be implemented in a number of different ways. In some embodiments, fringes of gratings are designed to vary in a progressive manner across the grating. In other embodiments, different sets of discrete gratings are placed serially. Gratings with rolled K-vectors can be implemented in a variety of ways. In many embodiments, the rolled K-vectors are designed such that the peak diffraction efficiency of each grating segment is optimized for its corresponding output angle at that position. In other embodiments, the peak diffraction efficiency of each grating at different positions is at an offset with its corresponding output angle at that position, thereby expanding the effective angular bandwidth of the grating. By introducing this offset, eyebox homogeneity can be improved. In some embodiments, offsets can improve total image brightness by a factor of two compared to just matching the peak diffraction efficiencies at different positions.

In many embodiments, different sets of fringes are superimposed or overlapped, creating a multiplexed grating with multiple gratings inside the same volume that can work independently and without interfering with each other. For example, if two volume gratings are recorded in the same device for two different Bragg wavelengths at the same incidence angle, the device can diffract the two selected wavelengths into different output directions with limited crosstalk. Multiplexing can be used to produce improved angular profiles by combining two gratings of similar prescription to extend the diffraction efficiency angular bandwidth and to give better luminance uniformity and color balance across the exit pupil and field of view. Multiplexing can also be used to encode two distinct diffraction prescriptions which can be design to project light into distinct field of regions or diffract light of two different wavelengths into a given field of view region. Steps can be taken to ensure that there is no competition between gratings during recording leading to unequal diffraction efficiencies and crosstalk between gratings in playback. In some embodiments, at least one of the input, fold, or output gratings can combine two or more angular diffraction prescriptions to expand the angular bandwidth. Similarly, in several embodiments, at least one of the input, fold, or output gratings can combine two or more spectral diffraction prescriptions to expand the spectral bandwidth. For example, a color multiplexed grating can be used to diffract two or more of the primary colors.

Although specific grating structures are discussed above, a person having ordinary skill in the art would appreciate that recording systems in accordance with various embodiments of the invention can be configured to record any kind of volume gratings, including but not limited to those described above.

Recording Volume Gratings

Volume gratings can be recorded in a waveguide cell using many different methods in accordance with various embodiments of the invention. The recording of optical elements in optical recording materials can be achieved using any number and type of electromagnetic radiation sources. Depending on the application, the exposure source(s) and/or recording system can be configured to record optical elements using varying levels of exposure power and duration. As discussed above with regards to SBGs, techniques for recording volume gratings can include the exposure of an optical recording material using two mutually coherent laser beams, where the superimposition of the two beams create a periodic intensity distribution along the interference pattern. The optical recording material can form grating structures exhibiting a refractive index modulation pattern matching the periodic intensity distribution. In HPDLC mixtures, the light intensity distribution results in diffusion and polymerization of monomers into the high intensity regions and simultaneous diffusion of liquid crystal into the dark regions. This phase separation creates alternating liquid crystal-rich and liquid crystal-depleted regions that form the fringe planes of the grating. The grating structures can be formed with slanted or non-slanted fringes depending on how the recording beams are configured. FIGS. 2A-2D conceptually illustrate two-beam recording processes in accordance with various embodiments of the invention. As shown, two methods can be used to create two different types of Bragg gratings—i.e., a transmission grating 200 and a reflection grating 202. Depending on how the two recording beams 204, 206 are positioned, the interference pattern 208 can record either a transmission or a reflection grating in an optical recording material 210. Differences between the two types of gratings can be seen in the orientation of the fringes (i.e., the fringes of a reflection volume grating are typically substantially parallel to the surface of the substrate, and the fringes of a transmission grating are typically substantially perpendicular to the surface of the substrate). During playback, a beam 212 incident on the transmission grating 200 can result in a diffracted beam 214 that is transmitted. On the other hand, a beam 216 that is incident on the reflection grating 202 can result in a beam 218 that is reflected.

Figure 3:
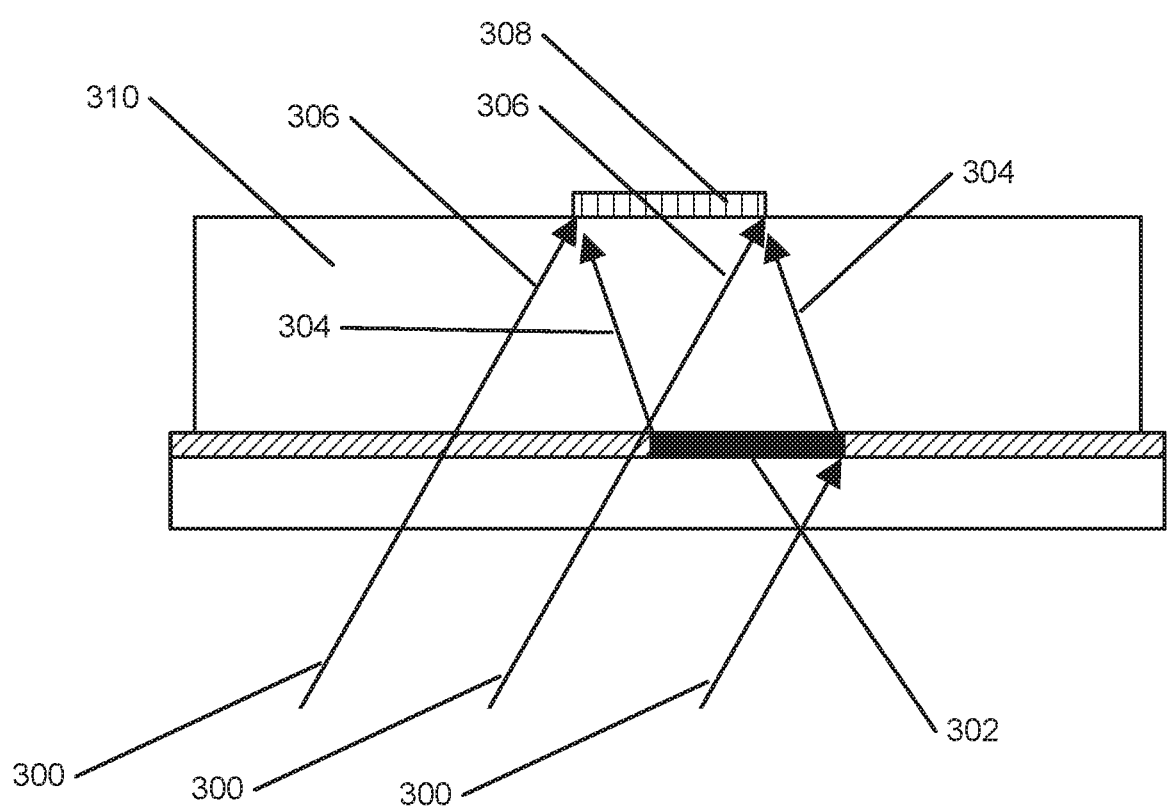
FIG. 3 conceptually illustrates a single-beam recording process utilizing an amplitude grating in accordance with an embodiment of the invention.

Another method for recording volume gratings in an optical recording material includes the use of a single beam to form an interference pattern onto the optical recording material. This can be achieved through the use of a master grating. In many embodiments, the master grating is a volume grating. In some embodiments, the master grating is an amplitude grating. Upon interaction with the master grating, the single beam can diffract. The first order diffraction and the zero order beam can overlap to create an interference pattern, which can then expose the optical recording material to form the desired volume grating. A single-beam recording process utilizing an amplitude grating in accordance with an embodiment of the invention is conceptually illustrated in FIG. 3. As shown, a beam 300 from a single laser source (not shown) is directed through an amplitude grating 302. Upon interaction with the grating 302, the beam 300 can diffract as, for example, in the case of the rays interacting with the black shaded region of the amplitude grating, or the beam 300 can propagated through the amplitude grating without substantial deviation as a zero-order beam as, for example, in the case of the rays interacting with the cross-hatched region of the amplitude grating. The first order diffraction beams 304 and the zero order beams 306 can overlap to create an interference pattern that exposes the optical recording layer 308 of a waveguide cell. In the illustrative embodiment, a spacer block 310 is positioned between the grating 302 and the optical recording layer 308 in order to alter the distance between the two components.

Although specific methods of recording volume gratings are discussed and shown in FIGS. 2A-2D and 3, recording systems in accordance with various embodiments of the invention can be configured to implement any of a number of methods for recording volume gratings, such as but not limited to general photolithographic techniques.

Recording System Configurations

Recording systems for recording volume gratings in waveguide cells can be configured in many different ways. In a number of embodiments, the recording system includes at least one exposure source and a plurality of stations configured to house exposure stacks containing waveguide cells. The exposure source can originate from any appropriate source of electromagnetic radiation, which can depend on the type of photosensitive material used. In some embodiments, the electromagnetic radiation source is a laser source. In several embodiments, the stations and exposure stacks are configured such that the exposure delivered to any given waveguide cell has one or more of exposure energy, exposure duration and/or exposure on/off schedule varying spatially across the recording plane. During operation, the laser source(s) can output light in the appropriate wavelength in order to expose waveguide cells housed in the stations to form volume gratings within the waveguide cells. Various methods for recording volume gratings such as those described in the sections above can be used. For instance, in many embodiments, a single-beam recording method along with a master grating is used. In other embodiments, a two-beam recording method is used.

Depending on the application and waveguide cell, one or more volume gratings can be recorded in a single waveguide cell. In many embodiments, one or more laser sources can be used to simultaneously record at least three volume gratings in a single waveguide cell. In some embodiments, one or more laser sources can be used to simultaneously expose at least two waveguide cells residing in one or more stations. In further embodiments, the laser source(s) can be used to simultaneously record at least three volume gratings in each of multiple waveguide cells. As can readily be appreciated, the number of waveguide cells exposed and the number of volume gratings simultaneously recorded per waveguide cell can vary greatly and can depend on the specific requirements of a given application. Furthermore, the number and type of exposure source used can vary depending on several factors, such as but not limited to space and power requirements. For example, in embodiments where a large number of gratings are to be recorded simultaneously, a high power laser source or multiple laser sources can be used to provide sufficient exposure power. In embodiments utilizing a single laser source to record multiple gratings and/or expose multiple waveguide cells, beam splitters can be used to create sub-beams that can allow for simultaneous exposures in different areas. The recording system can also include mirrors and other optical elements to manipulate and direct the light from the laser source(s) into the desired station(s). In some embodiments, the initial beam is expanded to cover the appropriate area of exposure.

Figure 4:
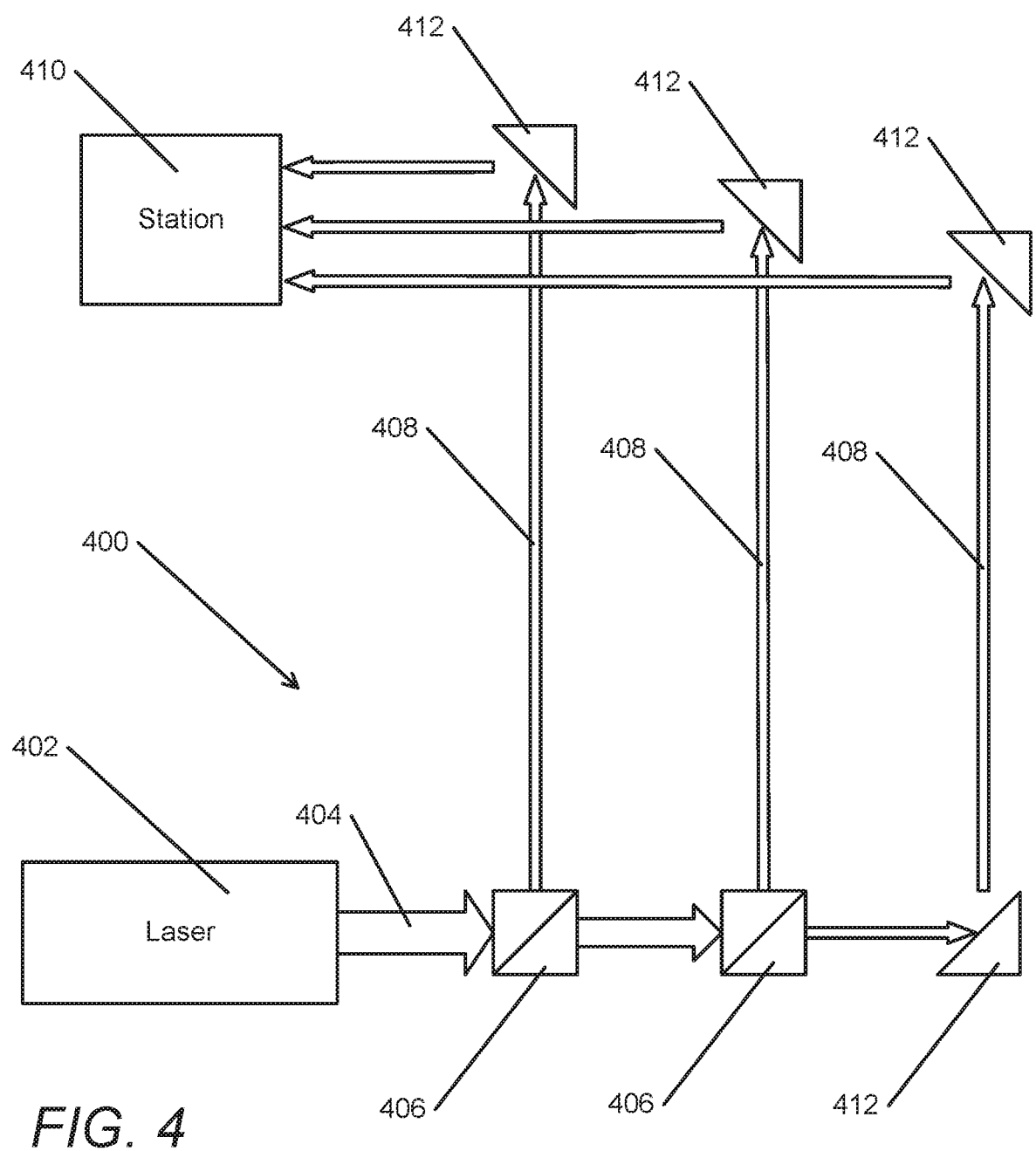
FIG. 4 conceptually illustrates a diagram of a recording system utilizing a single laser source in accordance with an embodiment of the invention.

FIG. 4 shows a diagram of a recording system 400 utilizing a single laser source 402 in accordance with an embodiment of the invention. As shown, an originating beam 404 is directed toward beam splitters 406 that are used to create three sub-beams 408. The sub-beams 408 are directed toward a station 410 using mirrors 412. In the illustrative embodiment, the three sub-beams 408 are used to record three volume gratings in a single waveguide cell housed in the station 410. As can readily be appreciated, these conceptual elements can be implemented using any suitable optical frames, movable adapters, exposure plates, etc. required to allow for the fixation of optical elements to implement such a recording system. Furthermore, although FIG. 4 illustrates a specific recording system configuration, any configuration can be implemented in accordance with various embodiments of the invention. For example, in some recording systems, more than three sub-beams are created and are directed across multiple stations. In several embodiments, multiple laser sources are utilized. Furthermore, the propagation paths of the beams can be manipulated in any of a number of different ways. For example, although FIG. 4 shows a recording system designed to direct the recording beams across a planar surface, recording systems can also be configured to direct the beams to propagate through 3D space. In such configurations, compact designs can be achieved along with other process efficiency improvements.

Station Configurations

Due to the feature sizes of volume gratings, the recording process can require a high degree of precision in positioning and leveling. As such, replacing exposed waveguide cells with new waveguide cells and recording volume gratings in the replaced waveguide cells can be time and/or resource intensive. In many embodiments, stations housing exposure stacks are implemented to allow for exposures of multiple waveguide cells in a rapid manner. In some embodiments, a station is configured to allow waveguide cells to be exchanged, allowing for the replacement of an exposed waveguide cell with an unexposed waveguide cell. In these implementations, the waveguide cell can be removed and replaced with another waveguide cell with little to no disturbance to the remainder of the system. This can be implemented in a variety of ways. In several embodiments, each of the stations contains a seating or recess that can house a waveguide cell, allowing for the waveguide cell to be swapped. In a number of embodiments, additional components can be incorporated for aligning the waveguide cell. For example, a mounting edge designed to hold the edge(s) of a waveguide cell can be implemented in the station to facilitate alignment of the waveguide cell. In various embodiments, the seating or recess can be removed from the station. In several embodiments, the station is configured to allow the entire exposure stack to be removed and swapped. In a number of embodiments, a stage assembly is implemented to house the waveguide cell. The stage assembly can be configured to position the waveguide cell in a desired position relative to the exposure stack. In such embodiments, swapping of the waveguide cells can be easily implemented while maintaining consistency in the positioning of the waveguide cell.

Figure 5:
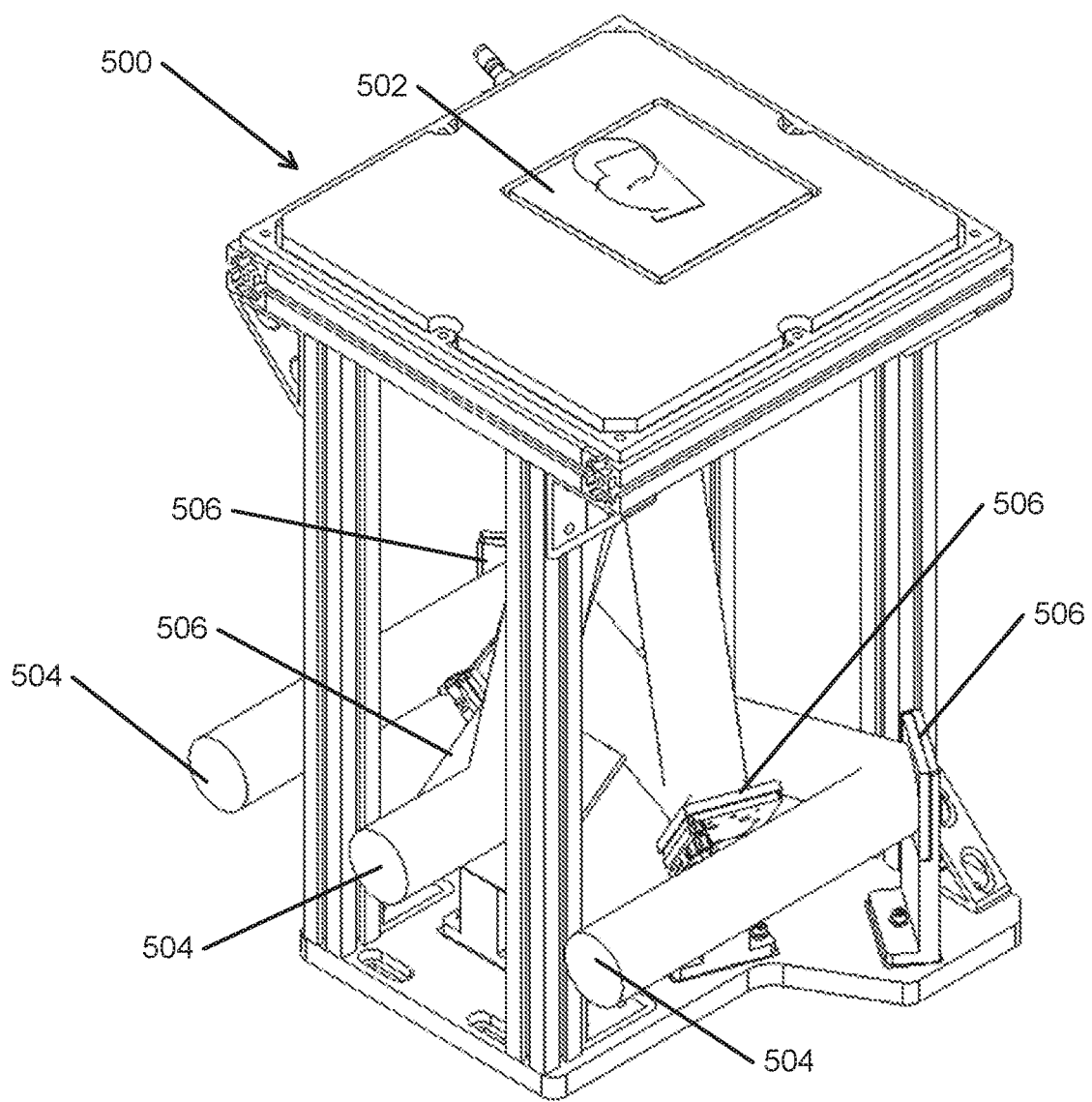
FIG. 5 conceptually illustrates an isometric view of a station configured to house an exposure stack in accordance with an embodiment of the invention.

FIG. 5 conceptually illustrates a station 500 housing an exposure stack in accordance with an embodiment of the invention. In the illustrative embodiment, the station 500 is configured to house a single exposure stack using a mounting recess 502. The station 500 includes laser pipes 504 and mirrors 506 for directing incoming light towards the exposure stack. As can readily be appreciated, the orientation of the exposure stack relative to the axes on which the beam travels can dictate whether the station housing the exposure stack includes additional mirrors to change the axis on which the recording beam propagates. Although FIG. 5 illustrates a specific station configuration, stations can be configured in a variety of different ways in accordance with various embodiments of the invention. For example, in some embodiments, the station is configured to house multiple exposure stacks. Given the photosensitive nature of waveguide cells, coverings such as but not limited to optical filters can be used to prevent ambient light from entering the station. In several embodiments, the covering includes at least one cutout for allowing light to pass through in order to expose the desired area(s) of the waveguide cell.

Figure 6:
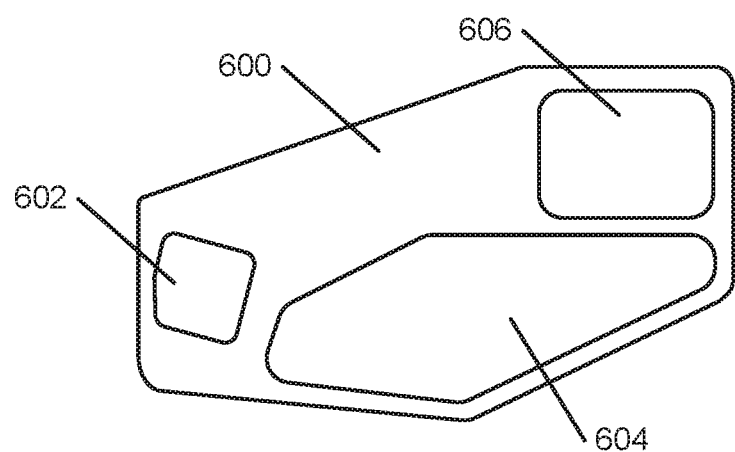
FIG. 6 conceptually illustrates a waveguide cell with marked exposure areas in accordance with an embodiment of the invention.

Exposure stacks can include various components that are designed to manipulate incoming light from the laser source(s) into the exposure areas of waveguide cells. Exposure areas are designated areas on the waveguide cell where the light is intended to expose. As can readily be appreciated, the sizes and shapes of the exposure areas can vary and can largely depend on the volume gratings that are to be written. For example, in some applications, different types of volume gratings requiring different levels of exposure are recorded in the same waveguide cell. In many embodiments, the recording system is configured to expose each individual exposure area with light of different levels of power and/or duration, which can be specifically tailored to the type of volume grating that is to be recorded. FIG. 6 conceptually illustrates a waveguide cell 600 with marked exposure areas for three gratings in accordance with an embodiment of the invention. The waveguide cell 600 has a curvilinear shape and is designed to implement an input grating, a fold grating, and an output grating. In the illustrative embodiment, exposure areas for the input grating 602, fold grating 604, and output grating 606 are shown. Although FIG. 6 illustrates a specific waveguide cell with specific exposure areas, waveguide cells can have any number of exposure areas of any shapes and sizes in accordance with various embodiments of the invention.

Exposure stacks can be constructed with different combinations of components. In many embodiments, an exposure stack includes a master grating and a waveguide cell. In some embodiments, the master grating is an amplitude grating. In further embodiments, the master grating is a chrome master made up of a transparent layer and a chrome layer that defines a grating structure. During the recording process, light from one or more laser sources can be directed toward the exposure stack using various optical components, such as but not limited to mirrors and beamsplitters. In a single beam recording system, a single light beam is directed toward the master grating in an exposure stack. Upon interaction with the master grating, the light beam can diffract, and the first order diffraction and zero order beam can form an interference pattern that exposes the waveguide cell to form a volume grating.

The recording system can be configured to position the master grating in a variety of different ways. In a number of embodiments, the master grating is positioned within the exposure stack such that the surface of the master grating is parallel to the surface of the waveguide cell. In some embodiments, the master grating is positioned to be parallel with the surface of the optical recording layer of the waveguide cell. The offset between surfaces of the master grating and the waveguide cell/optical recording layer can vary depending on several considerations, such as but not limited to the dimensions of the gratings to be formed. In several embodiments, the master grating is in direct contact with the waveguide cell. In other embodiments, different layers of materials within the exposure stack separate the optical recording layer from the master grating. As can readily be appreciated, the positions of the master grating and the waveguide cell can vary and can depend on the specific requirements of a given application. For example, in a variety of embodiments, the optical recording material is an HPDLC mixture encapsulated between two glass substrates. Consequently, in such embodiments, there exists at least a glass layer between the master grating and the optical recording layer during the recording process. In several embodiments, the exposure stack includes a protective layer, such as but not limited to a glass plate, that can be placed adjacent to the master grating to help prevent mechanical damage to the gratings. In various embodiments, optical oil can be used between the various layers to help provide continuity of refractive indices.

In some instances, light exposing the optical recording material can be partially reflected at the surface of the optical recording material. The reflected light can travel and reflect a second time, typically at the surface of the master grating. After the second reflection, the light can then travel back and expose the optical recording material. This secondary exposure is typically undesirable since it may result in degradation of the required gratings (for example, a reduction in grating index modulation contrast) and/or formation of spurious gratings. As such, in some embodiments, an additional layer of material is added and positioned between the master grating and the optical recording layer to help prevent exposure from reflected light. In many embodiments, the additional layer is a layer of glass. With the additional layer, distance between the master grating and the waveguide cell can be controlled. By increasing this distance, light reflected at an angle at the surface of the optical recording layer can travel further before being reflected a second time, changing the location at which the reflected light will be incident on the optical recording layer. The system can be designed such that this location is in an inconsequential area of the optical recording layer. In several embodiments, this location is not on the optical recording layer at all.

Figure 7:
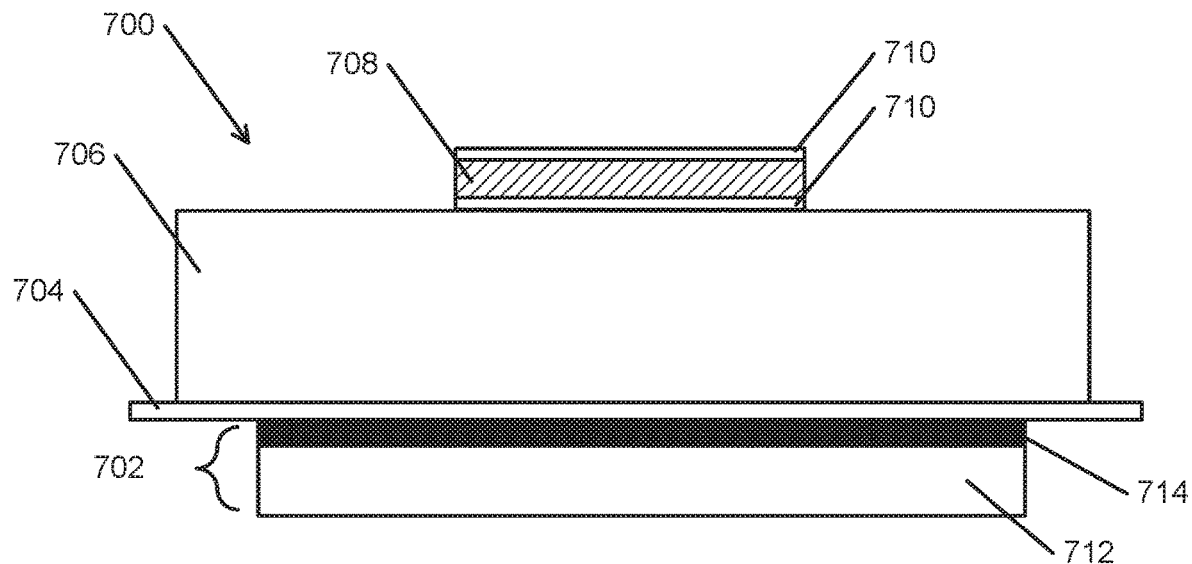
FIG. 7 conceptually illustrates an exposure stack in accordance with an embodiment of the invention.

A profile view of an exposure stack 700 in accordance with an embodiment of the invention is conceptually shown in FIG. 7. In the illustrative embodiment, the exposure stack 700 is configured for a single-beam recording process. As shown, the exposure stack 700 can include a master grating 702, a protective glass layer 704, a spacer plate 706, and a waveguide cell having an optical recording layer 708 between two glass plates 710. The spacer plate 706 can be used to increase the distance between the master grating 702 and the optical recording layer 708 while keeping the surfaces of the two components parallel. The additional distance can help reduce/prevent unwanted exposures from reflected light from the initial exposure. In the illustrative embodiment, the master grating 702 is an amplitude grating implemented using a chrome master having a glass layer 712 and a chrome layer 714 defining a grating structure (not shown). During a recording process, light from a laser source can be directed toward the master grating. Upon interaction with the grating surface, the light can diffract. The first order diffraction and zero order beam can combine to form an interference pattern, which exposes the optical recording layer 708 (similar to the process shown in FIG. 3). Although FIG. 7 illustrates a specific exposure stack configuration, many configurations can be implemented in accordance with various embodiments of the invention. For example, in embodiments utilizing a stage assembly, the waveguide cell is held by the stage assembly and can be positioned separately. In many embodiments, the materials of the additional layers are chosen to have similar or matching refractive indices to prevent any unwanted refraction of the exposure beam. In further embodiments, optical oil is added between various layers to further improve the matching of refractive indices. In some embodiments, holographic optical recording material is coated onto a substrate, which is then delivered to the stations and exposure stacks described above in a roll-to-roll holographic fabrication process.

Stages Housing Waveguide Cells

In many embodiments, the exposure system utilizes waveguide cell stages within stations to position waveguide cells in a desired manner. In some embodiments, the stage assembly is designed to provide the functionality and adjustability needed to position a waveguide cell in such a way that one face of the waveguide cell is held against a horizontal surface of an exposure stack. In several embodiments, the face of the waveguide cell is held against a master of an exposure stack. The stage assembly can be configured to position a waveguide cell to a desired orientation with respect to a feature of a master. The stage assembly can also be designed to house a particular type of waveguide cells. In a number of embodiments, the stage assembly includes a holder subassembly for housing a waveguide cell. In various embodiments, the holder subassembly is customized to hold a specific shape of waveguide cells. In a number of embodiments, the holder subassembly is designed to allow for waveguide cells to be swapped and repositioned in a consistent manner.

Figure 8:
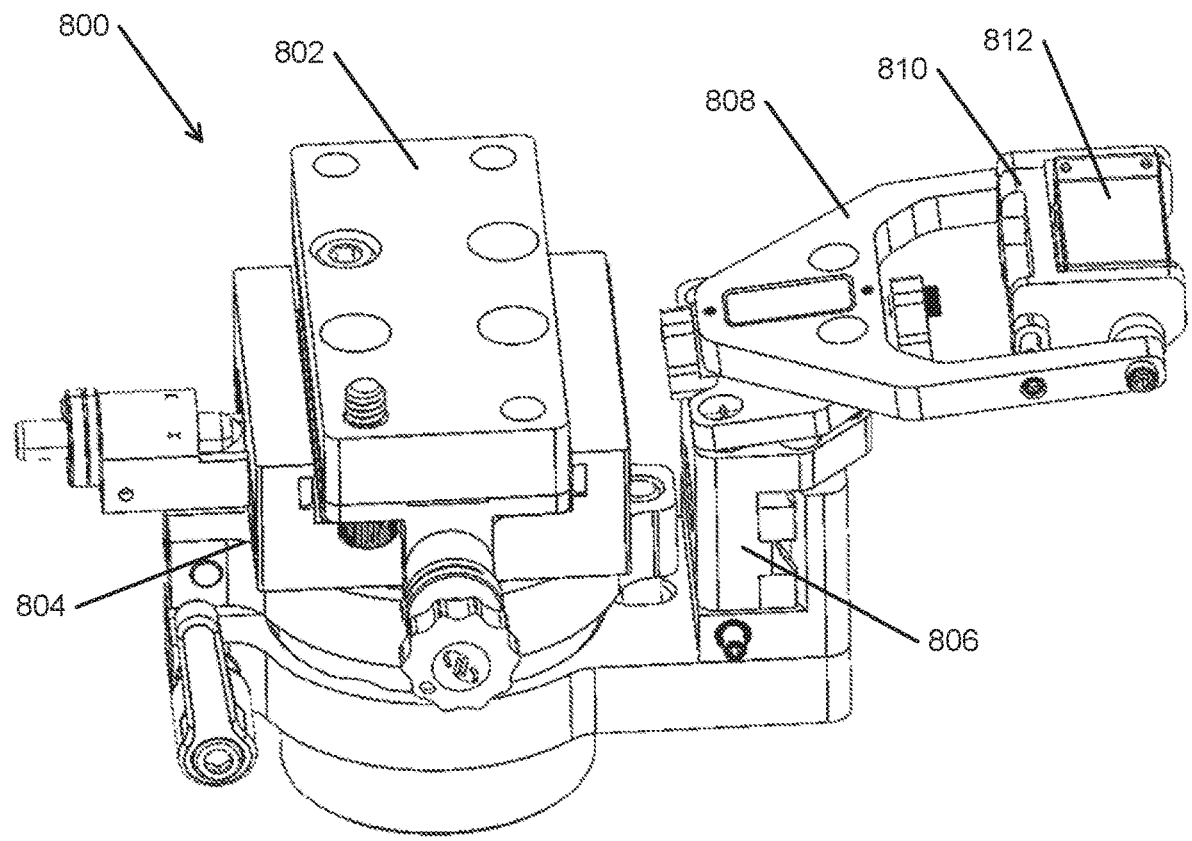
FIG. 8 conceptually illustrates a stage assembly for housing a waveguide cell in accordance with an embodiment of the invention.

FIG. 8 conceptually illustrates a stage assembly for housing a waveguide cell in accordance with an embodiment of the invention. As shown, the stage assembly 800 includes a base component 802, an XY linear translation stage 804, and a rotary stage 806. The rotary stage 806 can include a fork subassembly 808 and a holder subassembly 810 housing a waveguide cell 812. In a number of embodiments, one end of the base component 802 is designed to be affixed to a station of an exposure system. On the end, an XY linear translation stage 804 can be implemented to allow for positioning of the waveguide cell 810 across a plane. Combined with the functionalities of the rotary stage 806, the stage assembly 800 can be configured to allow for the positioning of the waveguide cell in three-dimensional space.

Figure 9A:
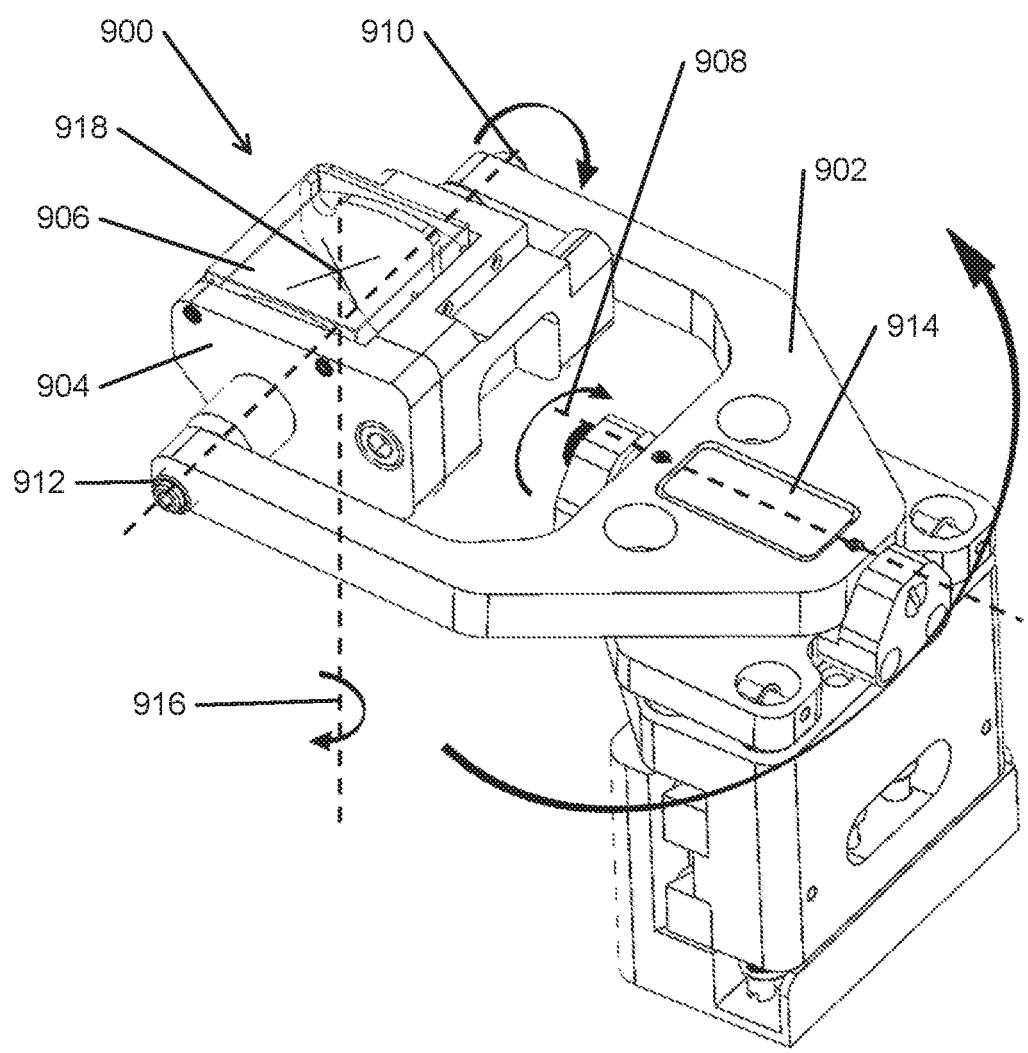
FIGS. 9A and 9B conceptually illustrate a rotary stage of a stage assembly in accordance with an embodiment of the invention.
Figure 9B:
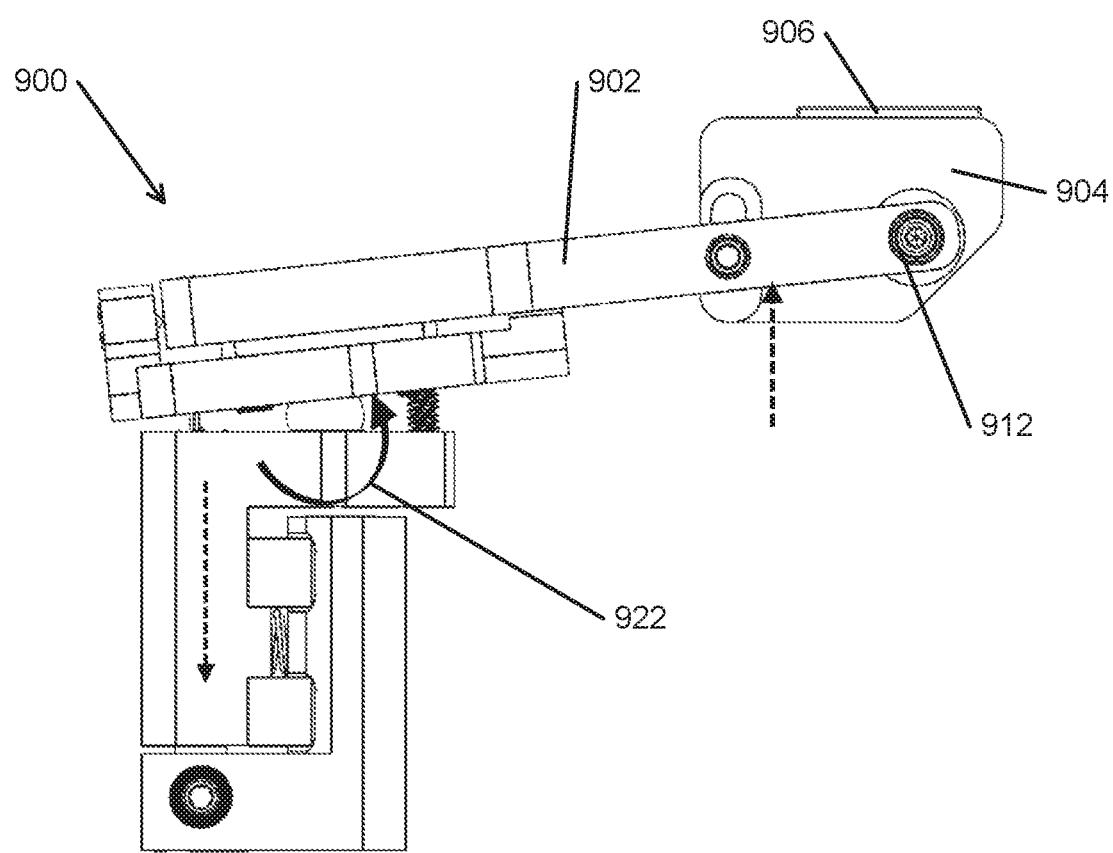

FIGS. 9A and 9B conceptually illustrate a rotary stage of a stage assembly in accordance with an embodiment of the invention. FIG. 9A shows a perspective view of the rotary stage 900, which includes a fork subassembly 902 and a holder subassembly 904. As shown, the rotary stage 900 can be configured to allow for the positioning of a waveguide cell 906 across several axes of rotation. In the illustrative embodiment, the fork subassembly 902 and holder subassembly 904 are configured to allow a mounted waveguide cell 906 to be rotated about two axes 908, 910 that are perpendicular to each other. The rotary stage 900 can be configured such that the holder subassembly 904 pivots about precision hardware 912 located in the fork subassembly while the fork subassembly 902 pivots about a ball bearing guide 914. The range of rotation of each axis can depend on the specific requirements of a given application. The combination of these two subassemblies 902, 904 can allow the waveguide cell 906 to remain parallel to the bottom surface of the exposure stack, irrespective of the nominal position of the exposure stack and/or of any positional changes of the system resulting from environmental disturbances such as but not limited to thermal changes. In many embodiments, the rotary stage 900 can be configured to allow for in-plane rotation of the waveguide cell 906. In the illustrative embodiment, the rotary stage 900 is configured to allow for the rotation of the waveguide cell 906 about an axis 916 which passes through the dimensional center 918 of the waveguide cell 906. This movement can allow for "pitch matching" to occur between the waveguide cell 906 and a feature of a master utilized in the exposure process.

FIG. 9B shows a side view of the rotary stage 900. As shown, the rotary stage 900 can also be configured to provide an upward preload of the fork subassembly 902, which can be used to maintain constant indefinite registration between the top surface of the waveguide cell 906 and the bottom surface of an exposure stack. The force of contact between the waveguide cell 906 and exposure stack can be dictated the spring constant k of the springs used to load the fork subassembly 902 upward. This range of upward rotation 922 can be mechanically limited by the design of the system.

Figure 10A:
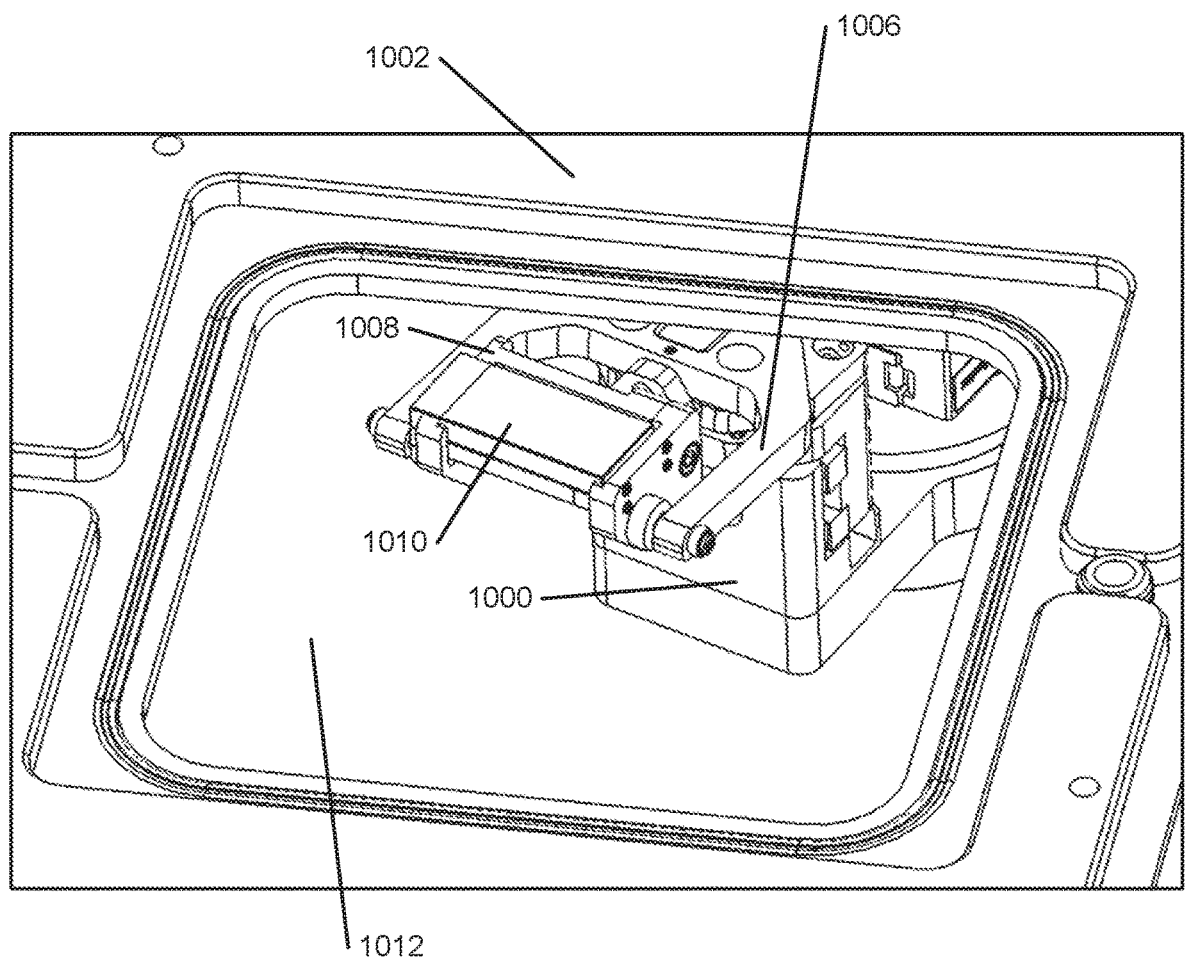
FIGS. 10A and 10B conceptually illustrate an affixed stage assembly in accordance with an embodiment of the invention.
Figure 10B:
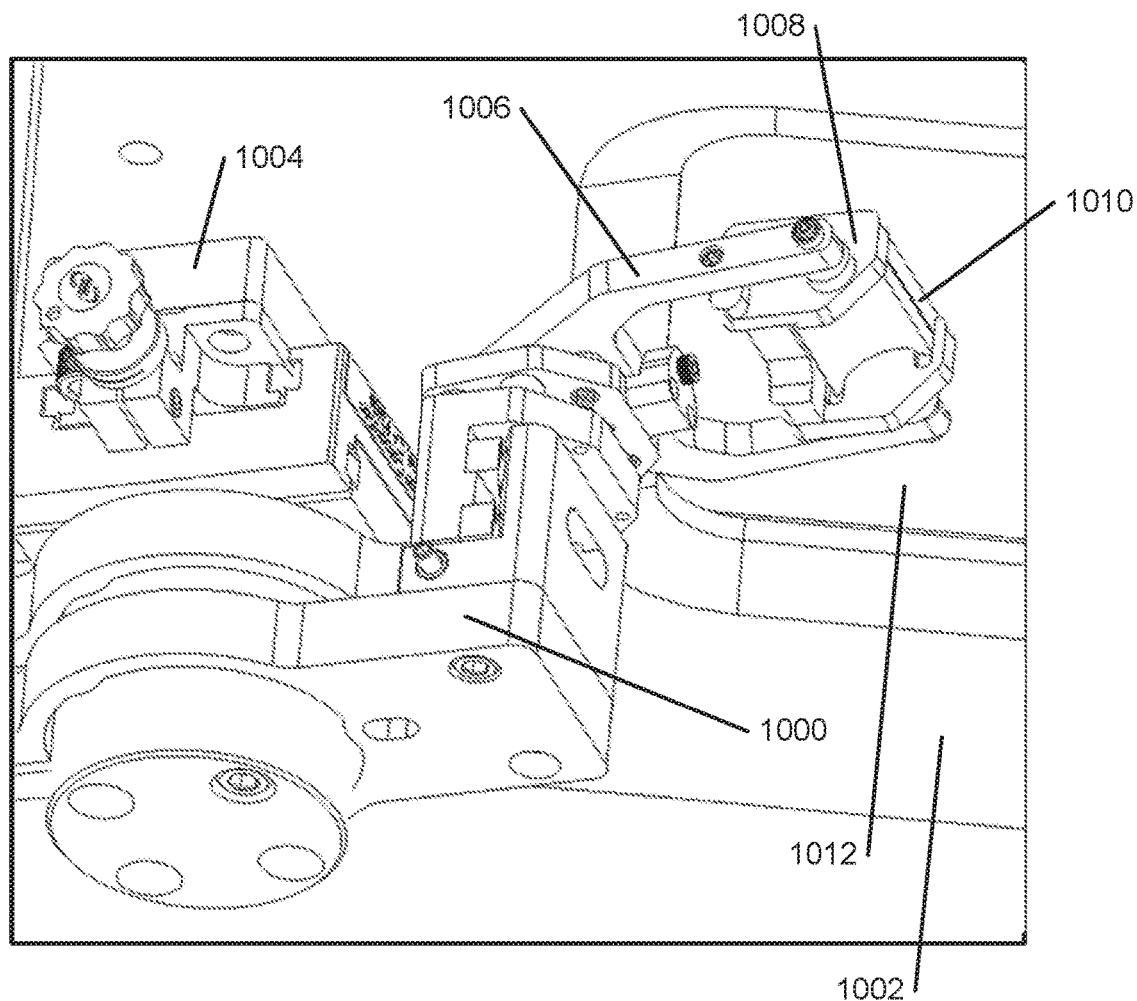

Stage assemblies can be implemented in various ways depending on the specific requirements of a given application. In a number of embodiments, the stage assembly is configured to be mounted to a station while maintaining the ability to reposition a waveguide cell. FIGS. 10A and 10B conceptually illustrate an affixed stage assembly in accordance with an embodiment of the invention. As shown, the stage assembly 1000 is affixed to a stationary component 1002 of a station through a base component 1004. In the illustrated embodiment, the stage assembly 1000 includes a fork subassembly 1006 and a holder subassembly 1008 capable of positioning a waveguide cell 1010 with respect to cut-out 1012 on which an exposure stack can be housed. The stage assembly can be designed to maintain a position while accounting for micro-movement of the exposure system dues to various environmental factors, such as but not limited to thermal changes and mechanical disturbances.

Embodiments for Cyclic Exposures

In many embodiments, the recording system includes a movable platform. In further embodiments, the movable platform can reposition optical components, such as but not limited to mirrors, to redirect the beam or sub-beam(s) to different sets of stations. As discussed above, stations can be configured to swap out waveguide cells. This form of "hot-swapping" along with the implementation of multiple stations and a movable platform allow for continuous operation of the recording system to record volume gratings in an indefinite number of waveguide cells. In many embodiments, the swapping of waveguide cells is done manually. In other embodiments, an automated system swaps the waveguide cells. As can readily be appreciated, the exact configuration of the movable platform and the component(s) it repositions can depend on the specific requirements of a given application. For example, in some embodiments, a single laser source is used to expose a first set of waveguide cells housed in a first set of stations. The movable platform can then reposition the mirrors, which can change the propagation path of the laser source to then record a second set of volume gratings housed in a second set of stations. During the second set of exposures, the first set of waveguide cells can be exchanged for a new set of unexposed waveguide cells to be housed in the first set of stations. The movable platform can then reposition the mirrors to direct the recording beam(s) to expose the new set of waveguide cells in the first set of stations. In this configuration, the recording of volume gratings in multiple waveguide cells can be performed in a cyclic manner. Although a two-stage cyclic exposure configuration is discussed, the recording system can be configured to perform different cycles of exposures with different numbers of stages, which can depend on the number of stations and the physical constraints of the system.

Figure 11A:
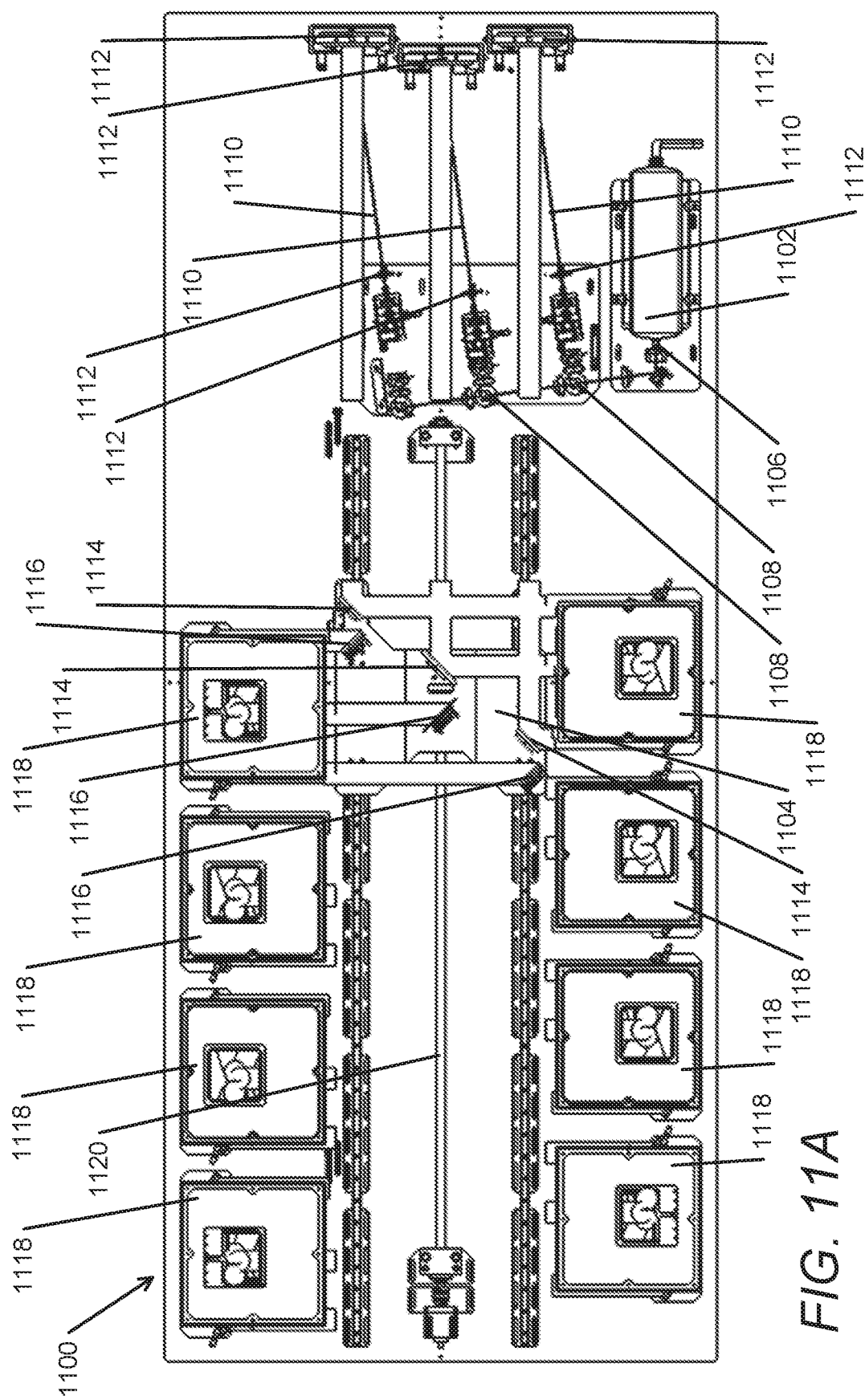
FIG. 11A conceptually illustrates a top view of a recording system utilizing a single laser source and a movable platform in accordance with an embodiment of the invention.
Figure 11B:
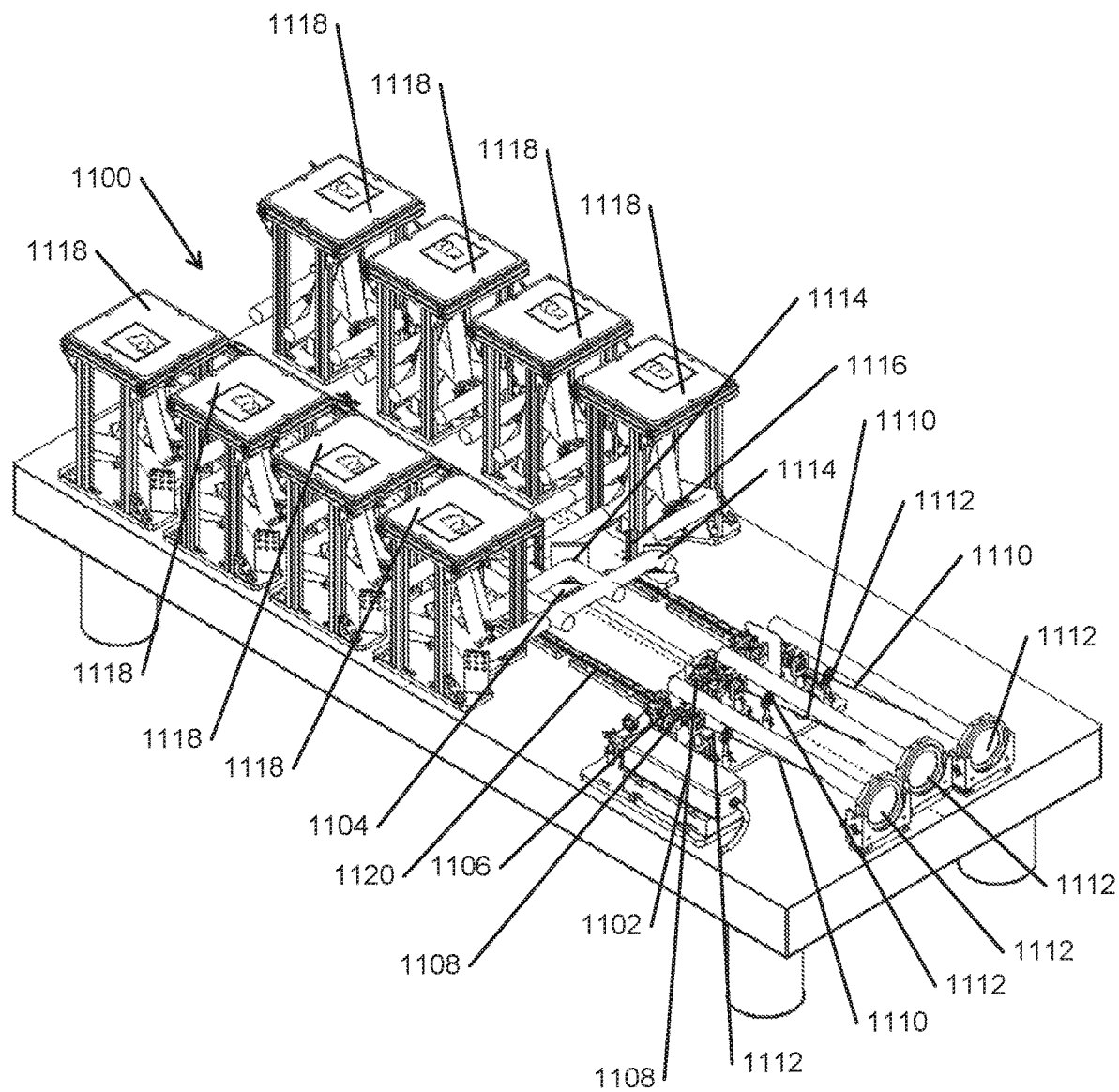
FIG. 11B conceptually illustrates an isometric view of a recording system utilizing a single laser source and a movable platform in accordance with an embodiment of the invention.

FIGS. 11A and 11B conceptually illustrate a top view and an isometric view, respectively, of a recording system 1100 utilizing a single laser source 1102 and a movable platform 1104 in accordance with an embodiment of the invention.

During operation, a beam 1106 originating from the laser source 1102 can pass through beamsplitters 1108 to form three sub-beams 1110. Beamsplitters can be implemented in several different ways. In many embodiments, a partially reflecting mirror is used as a beamsplitter. Beam expanding components 1112 can be used to manipulate the sizes of and to collimate the sub-beams 1110. In the illustrative embodiment, the system is designed to direct the sub-beams 1110 toward beamsplitters 1114 and mirrors 1116 mounted on the movable platform 1104. The beamsplitters 1114 mounted on the movable platform 1104 can further split the three sub-beams 1110 into six sub-beams, which are directed by the beamsplitters 1114 and mirrors 1116 to record three volume gratings onto each of two waveguide cells simultaneously. As shown, the movable platform 1104 can be positioned such that the mounted beamsplitters 1114 and mirrors 1116 can redirect the six sub-beams into sets of two different stations at a time. Within the stations 1118, mirrors are also implemented to redirect the incoming beam toward the exposure stacks. Once the recording process is completed for two waveguide cells, the movable platform 1104 can travel along a track 1120 to reposition the beamsplitters 1114 and mirrors 1116 to direct the sub-beams into two other stations. The process can continue in a cyclic manner by replacing exposed waveguide cells with unexposed waveguide cells during the period where recording is taking place in different stations. In some embodiments, the stations 1118 include sheet coverings to help reduce/prevent environmental light from affecting the exposure stack. The coverings can include cutouts designed to allow incoming exposure beams to pass through.

Although FIGS. 11A and 11B conceptually illustrate a specific recording system, any of a number of different configurations can be implemented in accordance with various embodiments of the invention. For example, any number of stations can be implemented depending on the specific requirements of the given application. In some embodiments, nine stations are implemented. In some embodiments, the stations and exposure stacks shown in the drawings can contain ports for the input and extraction of diagnostic laser beams and reflected light for use in monitoring the holographic exposure process. In several embodiments, the stations are positioned in 3D space and the movable platform is configured to move in 3D space to redirect the recording beams accordingly.

Although specific systems and methods for recording holographic gratings in waveguide cells are discussed above, many different configurations can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A holographic recording system comprising;
   at least one laser source configured to emit recording beams;
   a first set of one or more stations configured to house a first set of waveguide cells;
   a second set of one or more stations configured to house a second set of waveguide cells; and
   a movable platform configured to move between a first position and a second position, wherein:
   when the movable platform is in the first position, the at least one laser source is configured to emit a first set of one or more recording beams toward the first set of one or more stations; and
   when the movable platform is in the second position, the at least one laser source is configured to emit a second set of one or more recording beams toward the second set of one or more stations.

2. The holographic recording system of claim 1, further comprising a plurality of mirrors, wherein when the movable platform is in the first position, the at least one laser source is configured to emit the first set of one or more recording beams toward the first set of one or more stations by using the plurality of mirrors to direct the first set of one or more recording beams.

3. The holographic recording system of claim 1, wherein the first set of one or more recording beams comprises a first recording beam and a second recording beam.

4. The holographic recording system of claim 3, wherein:
   the at least one laser source comprises a first laser source and a second laser source; and
   when the movable platform is in the first position, the first laser source is configured to emit the first recording beam toward the first set of one or more stations and the second laser source is configured to emit the second recording beam toward the first set of one or more stations.

5. The holographic recording system of claim 3, further comprising a beamsplitter, wherein the at least one laser source is configured to emit the first and second recording beams by emitting an initial beam toward the beamsplitter.

6. The holographic recording system of claim 3, wherein:
   the first set of one or more stations comprises a first station; and
   when the movable platform is in the first position, the at least one laser source is configured to emit the first and second recording beams toward the first station.

7. The holographic recording system of claim 3, wherein:
   the first set of one or more stations comprises a first station and a second station; and
   when the movable platform is in the first position, the at least one laser source is configured to emit the first recording beam toward the first station and the second recording beam toward the second station.

8. The holographic recording system of claim 7, further comprising a beamsplitter mounted on the movable platform, wherein when the movable platform is in the first position, the at least one laser source is configured to emit the first and second recording beams by emitting an initial beam toward the beamsplitter.

9. The holographic recording system of claim 1, further comprising a pair of beamsplitters mounted on the movable platform and a stationary beamsplitter, wherein:
   the first set of one or more stations comprises a first station and a second station;
   the first set of one or more recording beams comprises first, second, third, and fourth recording beams; and
   when the movable platform is in the first position, the at least one laser source is configured to emit the first and second recording beams toward the first station and to emit the third and fourth recording beams toward the second station, wherein the first, second, third, and fourth recording beams are formed using the pair of beamsplitters and the stationary beamsplitter.

10. The holographic recording system of claim 1, wherein each of the stations within the first and second sets of stations comprises an optical filter for filtering out ambient light.

11. A method for recording volume gratings, the method comprising:
emitting a first set of one or more recording beams using at least one laser source;
directing the emitted first set of one or more recording beams toward a first set of one or more waveguide cells housed in a first set of one or more stations using at least one optical component mounted on a movable platform;
recording a first set of one or more volume gratings in the first set of one or more waveguide cells;
repositioning the movable platform;
emitting a second set of one or more recording beams using the at least one laser source;
directing the emitted second set of one or more recording beams toward a second set of one or more waveguide cells housed in a second set of one or more stations using the at least one optical component mounted on the movable platform; and
recording a second set of one or more volume gratings in the second set of one or more waveguide cells.

12. The method of claim 11, wherein the first set of one or more recording beams comprises a first recording beam and a second recording beam.

13. The method of claim 12, wherein:
the at least one laser source comprises a first laser source and a second laser source; and
the first recording beam is emitted by the first laser source and the second recording beam is emitted by the second laser source.

14. The method of claim 12, wherein the first and second recording beams are formed by emitting an initial beam toward a beamsplitter.

15. The method of claim 12, wherein:
the first set of one or more waveguide cells comprises a first waveguide cell; and
the emitted first and second recording beams are directed toward the first waveguide cell.

16. The method of claim 12, wherein:
the first set of one or more waveguide cells comprises a first waveguide cell and a second waveguide cell; and
the emitted first recording beam is directed toward the first waveguide cell and the emitted second recording beam is directed toward the second waveguide cell.

17. The method of claim 16, wherein the first and second recording beams are formed by emitting an initial beam toward a beamsplitter mounted on the movable platform.

18. The method of claim 11, wherein:
the at least one optical component comprises a first mounted beamsplitter and a second mounted beamsplitter;
the first set of one or more waveguide cells comprises a first waveguide cell and a second waveguide cell;
the first set of one or more recording beams is emitted using at least one laser source by:
emitting an initial recording beam toward a stationary beamsplitter to form a first recording beam and a second recording beam;
directing the first recording beam toward the first mounted beamsplitter to form a first recording sub-beam and a second recording sub-beam; and
directing the second recording beam toward the second mounted beamsplitter to form a third recording sub-beam and a fourth recording sub-beam; and
the emitted first set of one or more recording beams is directed toward a first set of one or more waveguide cells by:
directing the first and third recording sub-beams toward the first waveguide cell; and
directing the second and fourth recording sub-beams toward the second waveguide cell.

19. The method of claim 11, wherein the first set of one or more volume gratings is recorded using a single beam interference process.

20. A holographic recording system comprising:
a laser source;
first, second, third, and fourth stations, wherein each station comprises an exposure stack and a waveguide cell stage, wherein the waveguide cell stage is configured to:
house a waveguide cell;
position the waveguide cell such that a surface of the waveguide cell is parallel to a surface of the exposure stack; and
maintain the position of the waveguide cell while accounting for micro-movements;
a pair of stationary beamsplitters;
a movable platform mounted on a track, wherein the movable platform is configured to move along the track between a first position and a second position;
three beamsplitters mounted on the movable platform, wherein:
when the movable platform is in the first position, the laser source is configured to:
emit a first set of six recording sub-beams simultaneously by:
emitting a first initial recording beam toward the pair of stationary beamsplitters to form a first set of three recording beams; and
directing the first set of three recording beams toward the three mounted beamsplitters to form the first set of six recording sub-beams;
direct three recording sub-beams within the first set of the six recording sub-beams toward the first station; and
direct the other three recording sub-beams within the first set of six recording sub-beams toward the second station; and
when the movable platform is in the second position, the laser source is configured to:
emit a second set of six recording sub-beams simultaneously by:
emitting a second initial recording beam toward the pair of stationary beamsplitters to form a second set of three recording beams; and
directing the second set of three recording beams toward the three mounted beamsplitters to form the second set of six recording sub-beams;
direct three recording sub-beams within the second set of the six recording sub-beams toward the third station; and
direct the other three recording sub-beams within the second set of six recording sub-beams toward the fourth station.

* * * * *